(12) United States Patent
Shin et al.

(10) Patent No.: US 12,170,919 B2
(45) Date of Patent: Dec. 17, 2024

(54) METHOD AND DEVICE FOR MEASURING AND REPORTING CHANNEL STATE IN SIDELINK COMMUNICATION

(71) Applicant: Samsung Electronics Co., Ltd., Gyeonggi-do (KR)

(72) Inventors: Cheolkyu Shin, Gyeonggi-do (KR); Hyunseok Ryu, Gyeonggi-do (KR); Jeongho Yeo, Gyeonggi-do (KR); Jinyoung Oh, Gyeonggi-do (KR); Sungjin Park, Gyeonggi-do (KR); Jonghyun Bang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 355 days.

(21) Appl. No.: 17/607,252

(22) PCT Filed: Apr. 29, 2020

(86) PCT No.: PCT/KR2020/005682
§ 371 (c)(1),
(2) Date: Oct. 28, 2021

(87) PCT Pub. No.: WO2020/222532
PCT Pub. Date: Nov. 5, 2020

(65) Prior Publication Data
US 2022/0201528 A1    Jun. 23, 2022

(30) Foreign Application Priority Data

May 2, 2019  (KR) .......... 10-2019-0051582
Feb. 13, 2020  (KR) .......... 10-2020-0017951

(51) Int. Cl.
*H04W 24/10*  (2009.01)
*H04L 5/00*  (2006.01)
*H04W 4/40*  (2018.01)

(52) U.S. Cl.
CPC .......... *H04W 24/10* (2013.01); *H04L 5/0057* (2013.01); *H04W 4/40* (2018.02)

(58) Field of Classification Search
None
See application file for complete search history.

(56) References Cited

U.S. PATENT DOCUMENTS

| 2017/0195031 A1 | 7/2017 | Onggosanusi et al. |
| 2018/0097601 A1 | 4/2018 | Bagheri et al. |

(Continued)

FOREIGN PATENT DOCUMENTS

| CN | 108476049 | 8/2018 |
| CN | 109644455 | 4/2019 |

(Continued)

OTHER PUBLICATIONS

European Search Report dated May 17, 2022 issued in counterpart application No. 20799499.7-1216, 11 pages.

(Continued)

*Primary Examiner* — Anh Ngoc M Nguyen
(74) *Attorney, Agent, or Firm* — The Farrell Law Firm, P.C.

(57) ABSTRACT

Disclosed are: a communication technique for merging, with IoT technology, a 5G communication system for supporting a data transmission rate higher than that of a 4G system, and a system therefor. The present disclosure can be applied to intelligent services (for example, smart home, smart building, smart city, smart car or connected car, healthcare, digital education, retail, security, and safety-related services, and the like) on the basis of 5G communication technology and IoT0 related technology. A method for measuring and reporting a channel state in sidelink communication is disclosed.

14 Claims, 16 Drawing Sheets

(56) References Cited

U.S. PATENT DOCUMENTS

| | | | |
|---|---|---|---|
| 2018/0102817 A1 | 4/2018 | Park et al. | |
| 2019/0068343 A1 | 2/2019 | Kwak et al. | |
| 2020/0304183 A1* | 9/2020 | Chen | H04L 1/00 |
| 2021/0392620 A1* | 12/2021 | Ashraf | H04W 72/02 |
| 2022/0015067 A1 | 1/2022 | Li | |
| 2022/0094479 A1* | 3/2022 | Gao | H04L 5/0057 |
| 2022/0158804 A1* | 5/2022 | Lee | H04W 4/40 |

FOREIGN PATENT DOCUMENTS

| | | |
|---|---|---|
| KR | 10-2020-0114929 | 10/2020 |
| WO | WO 2016/163843 | 10/2016 |
| WO | WO 2018/174641 | 9/2018 |
| WO | 2018/229731 | 12/2018 |
| WO | WO 2018/0223349 | 12/2018 |

OTHER PUBLICATIONS

Intel Corporation, "Sidelink Physical Structure for NR V2X Communication", R1-1904294, 3GPP TSG RAN WG1 RAN1#96bis, Apr. 8-12, 2019, 16 pages.

Chinese Office Action dated Aug. 23, 2023 issued in counterpart application No. 202080033172.2, 13 pages.

PCT/ISA/210 Search Report issued on PCT/KR2020/005682, Jul. 27, 2020, pp. 5.

LG Electronics, 'Discussion on physical layer procedures for NR sidelink', R1-1905443, 3GPP TSG RAN WG1 Meeting #96bis, Xi'an, China, Apr. 3, 2019, pp. 14.

NEC, 'Physical layer procedures for NR sidelink', R1-1904656, 3GPP TSG RAN WG1 #96bis, Xi'an, China, Apr. 3, 2019, pp. 7.

Huawei, 'Sidelink physical layer procedures for NR V2X', R1-1903944, 3GPP TSG RAN WG1 Meeting #96bis, Xi'an, China, Apr. 2, 2019, pp. 19.

Samsung, 'On Physical Layer Procedures for NR V2X', R1-1901048, 3GPP TSG RAN WG1 Ad-Hoc Meeting 1901, Taipei, Taiwan, Jan. 11, 2019, pp. 13.

European Search Report dated Apr. 24, 2023 issued in counterpart application No. 20799499.7-1216, 7 pages.

Chinese Notice of Allowance dated Mar. 1, 2024 issued in counterpart application No. 202080033172.2, 9 pages.

PCT/ISA/237 Written Opinion issued on PCT/KR2020/005682, Jul. 27, 2020, pp. 9.

* cited by examiner

METHOD AND DEVICE FOR MEASURING AND REPORTING CHANNEL STATE IN SIDELINK COMMUNICATION

PRIORITY

This application is a National Phase Entry of PCT International Application No. PCT/KR2020/005682, which was filed on Apr. 29, 2020, and claims priority to Korean Patent Application Nos. 10-2019-0051582 and 10-2020-0017951, which were filed on May 2, 2019 and Feb. 13, 2020, respectively, the content of each of which is incorporated herein by reference.

TECHNICAL FIELD

The disclosure relates to a mobile communication system and, more particularly, to a method and an apparatus in which a reception UE measures a channel state and transmits the same to a transmission UE during a process in which a vehicle terminal supporting vehicle (Vehicle-to-everything (V2X)) communication exchanges information with another vehicle UE and a pedestrian portable UE through a sidelink.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system defined by 3GPP is called a "New Radio (NR) system".

The 5G communication system is considered to be implemented in higher frequency (mmWave) bands (e.g., 60 GHz bands), so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed in 5G communication systems and applied to the NR system.

In addition, in 5G communication systems, technical development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Recently, various research on sidelink communication is being conducted, and accordingly it is required to improve channel state measurement and reporting in sidelink communication.

DISCLOSURE OF INVENTION

Technical Problem

The disclosure relates to a wireless communication system, and also a method and an apparatus in which a reception UE measures a channel state and reports the same to a transmission UE during a process in which a vehicle UE supporting V2X exchanges information with another vehicle UE and a pedestrian portable UE through a sidelink. Specifically, the disclosure proposes a reference signal transmission method for channel state measurement in a sidelink and a channel measurement and report method therethrough. Further, a UE operation according to the proposed disclosure is provided.

Solution to Problem

In a wireless communication system according to an embodiment of the disclosure to solve the problems, a method of a second UE performing sidelink communication with a first UE includes: receiving first configuration information related to a Channel State Information-Reference Signal (CSI-RS) from the first UE; receiving Sidelink Control Information (SCI) triggering a CSI report from the first UE; measuring the CSI-RS, based on the first configuration information when the CSI-RS is received from the first UE; and transmitting CSI generated by the measurement to the first UE, based on second configuration information related to a preconfigured CSI report, wherein the first configuration information includes information on a number of antenna ports through which the CSI-RS is transmitted and a resource element in which the CSI-RS is transmitted, and the SCI is transmitted based on the second configuration information including information indicating enabling of the CSI report.

In a wireless communication system according to an embodiment of the disclosure, a second UE performing sidelink communication with a first UE includes: a transceiver; and a controller configured control the transceiver to receive first configuration information related to a Channel State Information-Reference Signal (CSI-RS) from the first UE, control the transceiver to receive Sidelink Control Information (SCI) triggering a CSI report, measure the CSI-RS, based on the first configuration information when the CSI-RS is received from the first UE, and control the transceiver to transmit a CSI generated by the measurement to the first UE, based on second configuration information related to a preconfigured CSI report, wherein the first configuration information includes a number of antenna ports through which the CSI-RS is transmitted and a resource element in which the CSI-RS is transmitted, and the SCI is transmitted based on the second configuration information including information indicating enabling of the CSI report.

Advantageous Effects of Invention

The disclosure proposes a method by which a reception UE measures a channel state and reports the same to a transmission UE in sidelink communication, thereby improving transmission efficiency of the sidelink. Further, a channel state report method according to the proposed method may be effectively used for congestion control. A reference signal transmission method according to the proposed method may be used to more stably support Radio Link Monitoring (RLM).

BEST MODE FOR CARRYING OUT THE INVENTION

Figure 1:
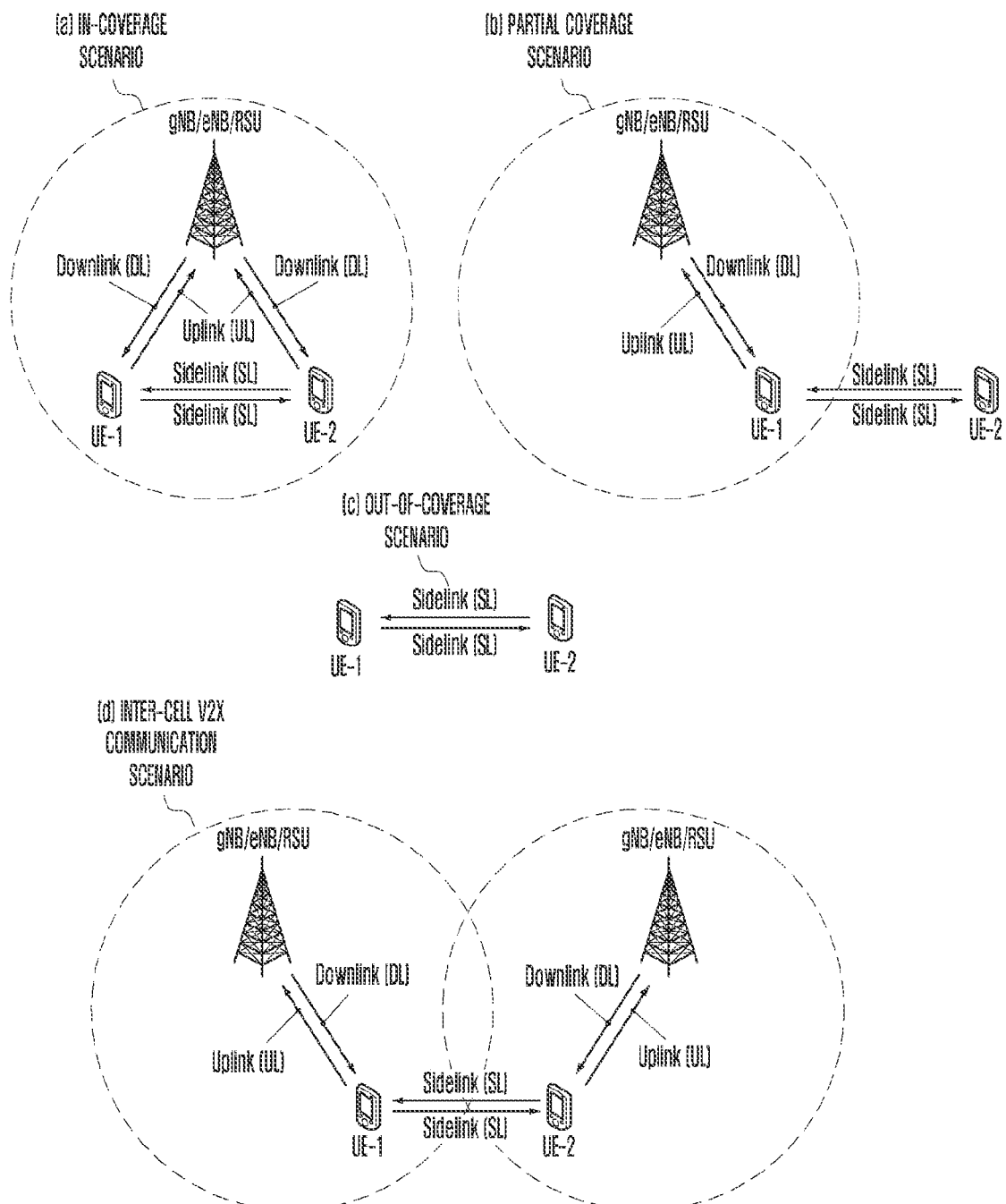
FIG. 1 illustrates an example of a system for describing an embodiment of the disclosure.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

The detailed description of embodiments of the disclosure is made mainly on the basis of a New Radio (NR) access network (or a new RAN) and packet core (a 5G system, a 5G core network, or a Next Generation (NG) core) which is a core network on the $5^{th}$ Generation (5G) mobile communication standard specified by the 3GPP corresponding to a mobile communication standardization organization, but the main subject of the disclosure can be applied to other communication systems having a similar technical background with slight modification without departing from the scope of the disclosure, which can be determined by those skilled in the art.

In the 5G system, a Network Data Collection and Analysis Function (NWDAF) that is a network function for analyzing and providing data collected by a 5G network may be defined to support network automation. The NWDAF may collect information from the 5G network, store and analyze the information, and provide the result to an unspecified Network Function (NF), and the analysis result may be independently used by each NF.

In the following description, terms and names defined in the 3rd generation partnership project long term evolution (3GPP LTE) standards (standards for 5G, NR, LTE, or similar systems) may be used for the convenience of description. However, the disclosure is not limited by these terms and names, and may be applied in the same way to systems that conform other standards.

Further, in the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In order to meet wireless data traffic demands that have increased after 4G communication system commercialization, efforts to develop an improved 5G communication system (New Radio (NR)) have been made. The 5G communication system has been designed to use resources in a mmWave band, for example, a frequency band of 28 GHz in order to achieve a high data transmission rate. In the 5G communication system, technologies such as beamforming, massive MIMO, Full Dimensional MIMO (FD-MIMO), array antenna, analog beam-forming, and large scale antenna are discussed to mitigate a propagation path loss in the mmWave band and increase a propagation transmission distance.

In addition, unlike LTE, the 5G communication system supports various subcarrier spacings such as 30 kHz, 60 kHz, and 120 kHz including 15 kHz, and a physical control channel uses polar coding and a physical data channel uses a Low Density Parity Check (LDPC). Furthermore, as waveforms for uplink transmission, not only a CP-OFDM but also a DFT-S-OFDM is used. While resources for Hybrid ARQ (HARQ) retransmission in units of Transport Blocks (TBs) are allocated in LTE, resources for HARQ retransmission based on a Code Block Group (CBG) including a plurality of Code Blocks (CBs) may be additionally allocated in 5G.

As described above, a plurality of services may be provided to a user in a communication system, and in order to provide the plurality of services to the user, a method of providing each service in the same time interval according to a characteristic thereof and an apparatus using the same are needed. Various services provided by the 5G communication system are being researched, and one thereof is a service that satisfies requirements of low latency and high reliability.

In the case of vehicle communication, standardization of LTE-based V2X has been competed in 3GPP Rel-14 and Rel-15 on the basis of the Device-to-Device (D2D) communication structure, and research on the development of V2X based on 5G New Radio (NR) is currently conducted. In NR V2X, unicast communication, groupcast communication, multicast communication, and broadcast communication will be supported between UEs. Further, NR V2X aims at providing more evolved service such as platooning, advanced driving, extended sensor, and remote driving, unlike LTE V2X aiming at transmitting and receiving basic safety information required for driving of vehicles.

In the D2D and V2X sidelink based on the existing LTE system, only broadcast communication is supported, and thus a function in which the reception UE measures a channel state and reports the same to the transmission UE is not supported. Since the NR V2X considers not only broadcast communication but also unicast between UEs and groupcast communication and aims at supporting an advanced service requiring more improved transmission efficiency, the function in which the reception UE reports the channel state to the transmission UE is needed.

Specifically, the channel state measurement and report in the sidelink is a function in which the reception UE measures a channel on the basis of a reference signal transmitted by the transmission UE and transmits a feedback of Sidelink Channel State Information (SL CSI) to the transmission UE on the basis of the measurement. At this time, a reference signal transmitted by the transmission UE to receive a report of the SL CSI in the sidelink is named a Sidelink Channel State Information Reference Signal (SL CSI-RS).

When the reception UE estimates a channel state using the SL CSI-RS and reports the SL CSI to the transmission UE therethrough, the transmission UE may use the SL CSI information for allocating transmission resources and determining transmission parameters. If the UE reports the SL CSI information to the BS, the BS refers to the SL CSI information for determining transmission parameters in the case of a Uu interface between the BS and UE, but a different operation may be considered in the case of the V2X sidelink. A method by which the transmission UE has to configure the transmission parameters on the basis of the SL CSI information transmitted by the reception UE may be considered in consideration of information indicating that the V2X sidelink is communication between UEs.

All of periodic/aperiodic CSI-RS transmission and periodic/aperiodic CSI transmission are supported in the case of the Uu interface between the BS and UE, but there may be difficulty in supporting periodic SL CSI-RS transmission and periodic SL CSI transmission in the sidelink since the UE may be in In-coverage (IC), Partial Coverage (PC), or Out-of-Coverage (OOC). Accordingly, when periodic SL CSI-RS transmission is not supported, the reception UE may have difficulty in performing Radio Link Monitoring (RLM). Further, a transmission parameter configuration range may be determined according to whether the corresponding channel is congested in the V2X sidelink. This corresponds to a congestion control function for configuring a transmission parameter to increase a transmission success probability of the UE when the UE determines whether to access the channel and accesses the channel when the channel is congested. Accordingly, the UE may measure a Channel Busy Ratio (CBR) and determine the transmission parameter configuration range according thereto. Further, reflection of the CBR may be also considered when the SL CSI is transmitted.

Unlike the Uu interface between the BS and the UE, the V2X sidelink allocates transmission resources on the basis of a resource pool and supports a mode (Mode 1) in which the corresponding BS configures allocation of transmission resources and a mode (Mode 2) in which the UE directly allocate transmission resources through sensing. Accordingly, a method by which the UE triggers SL CSI transmission, allocates a feedback channel, and transmits and receives an SL CSI in consideration of the allocation mode of transmission resources of the sidelink is needed.

As described above, a method and an operation of the corresponding UE for supporting the function in which the reception UE measures the channel state and reports the same to the transmission UE in the sidelink should be defined. However, the discussion thereof has never been conducted. Accordingly, the disclosure proposes a CSI-RS transmission and CSI report method in consideration of a transmission scenario in the sidelink. Specifically, in the operation through unicast between the UEs in the sidelink, a UE operation method and apparatus for an SL CSI-RS transmission and SL CSI report method considering an IC/OOC environment, resource pool-based transmission, transmission resource allocation modes (Mode1/2), supporting of RLM, and the CBR are proposed.

Embodiments of the specification are proposed to support the scenario, and particularly aim at providing a method and an apparatus in which the reception UE measures a channel state and reports the same to the transmission UE in a sidelink environment supporting unicast and groupcast communication.

FIG. 1 illustrates an example of a system for describing an embodiment of the disclosure.

FIG. 1A illustrates an example of the case (In-Converge (IC)) in which all V2X UEs (UE-1 and UE-2) are located within the coverage of a Base Station (BS).

All V2X UEs may receive data and control information from the BS through downlink (DL) or transmit data and control information to the BS through uplink (UL). At this time, the data and the control information may be data and control information for V2X communication. Alternatively, the data and the control information may be data and control information for general cellular communication. The V2X UEs may transmit/receive data and control information for V2X communication through a sidelink (SL).

FIG. 1B illustrates an example of the case in which UE-1 of the V2X UEs is located inside the coverage of the BS and UE-2 is located outside the coverage of the BS. The example of FIG. 1B may be an example related to partial coverage.

UE-1 located inside the coverage of the BS may receive data and control information from the BS through a downlink (DL) or transmit data and control information to the BS through an uplink (UL).

UE-2 located outside the coverage of the BS cannot receive data and control information from the BS through a downlink and cannot transmit data and control to the BS through an uplink.

UE-2 may transmit/receive data and control information for V2X communication through the sidelink.

FIG. 1C illustrates an example of the case in which all V2X UEs are located Out Of Coverage (OOC) of the BS.

Accordingly, UE-1 and UE-2 cannot receive data and control information from the BS through the downlink and cannot transmit data and control information to the BS through the uplink.

UE-1 and UE-2 may transmit/receive data and control information for V2X communication through the sidelink.

FIG. 1D illustrates an example of a scenario in which UEs located in different cells perform V2X communication. Specifically, FIG. 1D illustrates the case in which a V2X transmission UE and a V2X reception UE access different BSs (RRC-connected state) or camp on the BSs (RRC connection-released state, that is, RRC idle state). At this time, UE-1 may be a V2X transmission UE, and UE-2 may be a V2X reception UE. Alternatively, UE-1 may be a V2X reception UE, and UE-2 may be a V2X transmission UE.

UE-1 may receive a V2X-dedicated System Information Block (SIB) from the BS which UE-1 accesses (or UE-1 camps on) and UE-2 may receive a V2X-dedicated SIB from another BS which UE-2 accesses (or UE-2 camps on). At this time, the V2X-dedicated SIB information which UE-1 receives and the V2X-dedocated SIB information which UE-2 receives may different from each other. Accordingly, for V2X communication between UEs located in different cells, information may be unified or more flexible parameter configuration may be supported through a parameter configuration method and apparatus of the disclosure.

Although FIG. 1 illustrates a V2X system including two UEs (UE-1 and UE-2) for convenience of description, but the disclosure is not limited thereto. The downlink and the uplink between the BS and the V2X UEs may be referred to as a Uu interface, and the sidelink between the V2X UEs may be referred to as a PC5 interface. Accordingly, the terms may be interchangeably used in the disclosure.

Meanwhile, in the disclosure, the UE may be a vehicle supporting Vehicle-to-Vehicle (V2V) communication, a vehicle or a handset of a pedestrian (that is, a smartphone) supporting Vehicle-to-Pedestrian (V2P) communication, a vehicle supporting Vehicle-to-Network (V2N) communication, or a vehicle supporting Vehicle-to-Infrastructure (V2I)

communication. In the disclosure, the UE may be a Road Side Unit (RSU) having a UE function, an RSU having a BS function, or an RSU having some of the BS functions and some of the UE functions.

In the disclosure, it is predefined that the BS may be a BS supporting both V2X communication and general cellular communication or a BS supporting only V2X communication. The BS may be a 5G BS (gNB), a 4G BS (eNB), or a Road Site Unit (RSU). Accordingly, unless specially mentioned, the BS and the RSU may be the same concept and thus interchangeably used.

Figure 2:
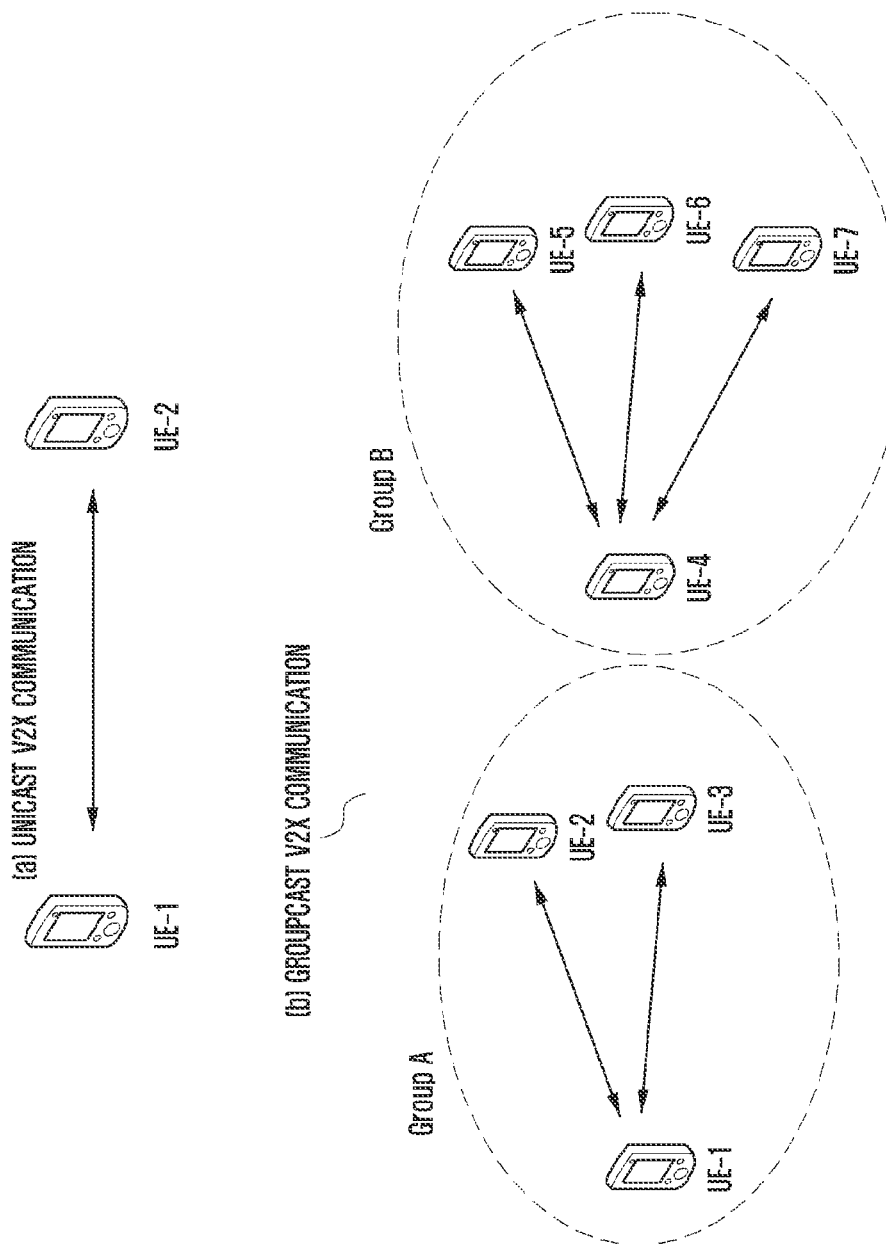
FIG. 2 illustrates an example of a V2X communication method performed through the sidelink in connection with an embodiment of the disclosure.

FIG. 2 illustrates an example of a V2X communication method performed through a sidelink.

As illustrated in FIG. 2A, a TX UE and an RX UE may communicate in one-to-one manner, which may be called unicast communication.

As illustrated in FIG. 2B, a TX UE and an RX UE may communicate in a one-to-many manner, which may be called groupcast or multicast.

In FIG. 2B, UE-1, UE-2, and UE-3 form one group (group A) and establish groupcast communication, and UE-4, UE-5, UE-6, and UE-7 form another group (group B) and establish groupcast communication. Each UE may perform groupcast communication only within the group to which the UE belongs, and communication between different groups may be performed through unicast, groupcast, or broadcast communication. Although FIG. 2B illustrates that two groups are formed, the disclosure is not limited thereto.

Meanwhile, although not illustrated in FIG. 2, the V2X UEs may perform broadcast communication. The broadcast communication corresponds to the case in which all V2X UEs receive data and control information transmitted by the V2X transmission UE through the sidelink. For example, in FIG. 2B, when it is assumed that UE-1 is a transmission UE for broadcast, all UEs (UE-2, UE-3, UE-4, UE-5, UE-6, and UE-7) receive data and control information transmitted by UE-1.

In NR V2X, supporting the type in which a vehicle UE transmits data only to one specific node through unicast and the type in which the vehicle UE transmits data to a plurality of specific UEs through groupcast may be considered unlike in LTE V2X. For example, the unicast and groupcast technologies may be useful in consideration of a service scenario such as platooning, which is a technology in which two or more vehicles are connected through one network and move in a cluster form. Specifically, unicast communication may be needed by a leader node in the group connected through platooning to control one specific node, and group cast communication may be needed to simultaneously control groups including a plurality of specific nodes.

Figure 3:
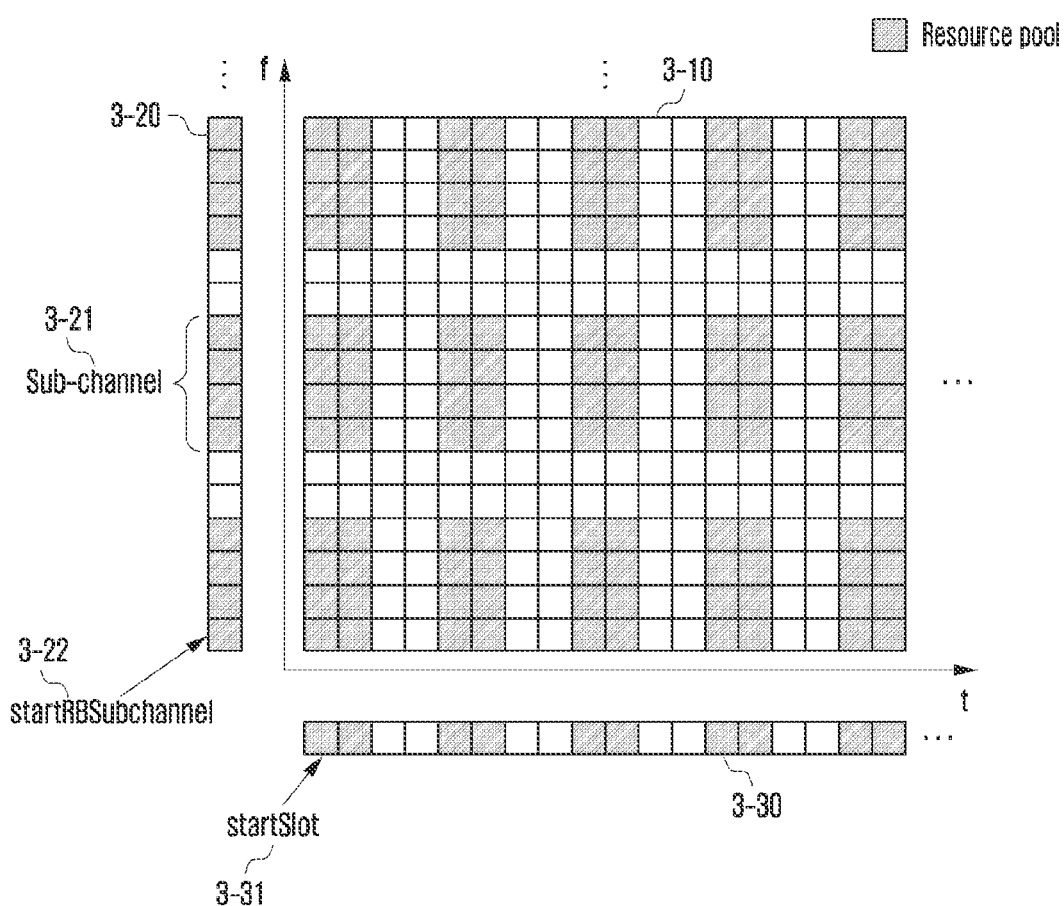
FIG. 3 illustrates an example of a resource pool defined as a set of resources on the time and frequency used for transmission and reception of the sidelink in connection with an embodiment of the disclosure.

FIG. 3 illustrates an example of a resource pool defined as a set of resources on the time and frequency used for transmission and reception of the sidelink.

Reference numeral 3-10 illustrates an example of the case in which the resource pool is discontinuously allocated on the time and frequency. The disclosure focuses on the case in which the resource pool is discontinuously allocated in the frequency, but it is noted that the resource pool may be continuously allocated in the frequency.

Reference numeral 3-20 illustrates an example of the case in which the resource pool is discontinuously allocated in the frequency.

A resource allocation unit (resource granularity) in the frequency axis within the resource pool may be one or more Physical Resource Blocks (PRBs). A resource allocation unit on the time axis within the resource pool may be one or more OFDM symbols. For example, one slot including 14 OFDM symbols may be the resource allocation unit on the time axis within one resource pool.

Reference numeral 3-21 illustrates an example of the case in which resource allocation on the frequency axis is performed in units of subchannels. A subchannel may be defined as a resource allocation unit on the frequency including one RB. In other words, the subchannel may be defined as an integer multiple of RBs. Reference numeral 3-21 illustrates an example of the case in which the size of the subchannel is 4 successive PRBs. The size of the subchannel may be differently configured, and one subchannel generally includes successive PRBs, but is not limited to successive PRBs. The subchannel may be a basic unit of resource allocation for a Physical Sidelink Shared Channel (PSSCH), a Physical Sidelink Control Channel (PSCCH), or a Physical Sidelink Feedback Channel (PSFCH). At this time, the size of the subchannel may be differently configured according to whether the corresponding channel is a PSSCH, a PSCCH, or a PSFCH. Further, it is noted that the term of subchannel may be replaced with the term of Resource Block Group (RBG).

startRBSubchannel as indicated by reference numeral 3-22 indicates a start location of the subchannel in the frequency of the resource pool.

Reference numeral 3-30 illustrates an example of the case in which discontinuous resource allocation is performed on the time. A resource allocation unit (granularity) on the time may be a slot. The disclosure focuses on the case in which the resource pool is discontinuously allocated on the time, but it is noted that the resource pool may be continuously allocated on the time.

startSlot as indicated by reference numeral 3-31 indicates a start location of a slot on the time in the resource pool.

Figure 4:
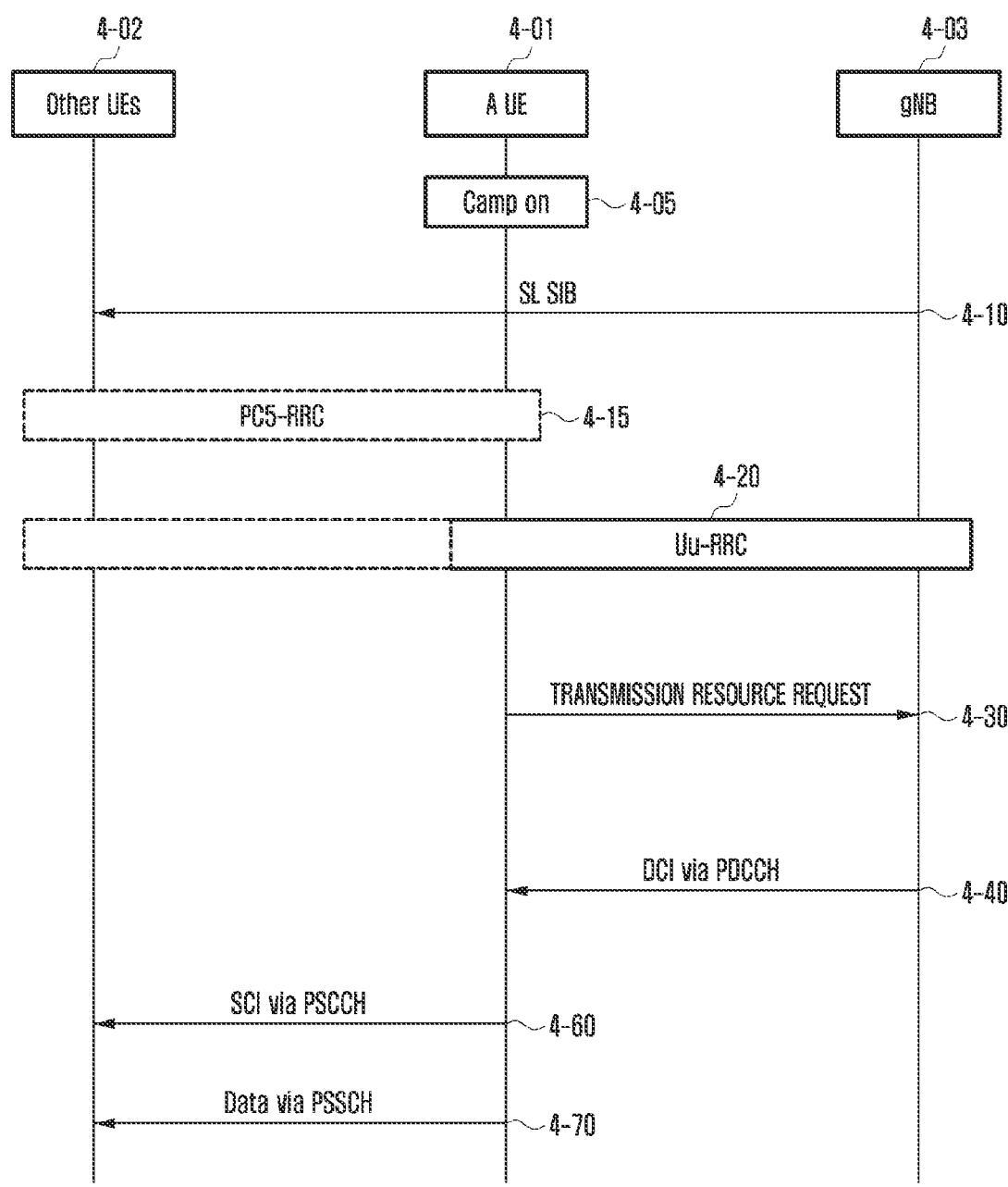
FIG. 4 illustrates an example of a scheduled resource allocation (mode 1) method in the sidelink in connection with an embodiment of the disclosure.

FIG. 4 illustrates an example of a method of scheduled resource allocation (mode 1) in the sidelink. Scheduled resource allocation (mode 1) is a method by which the BS allocates resources used for sidelink transmission to RRC-connected UEs through a dedicated scheduling scheme. In the method, the BS may manage sidelink resources, and thus the method may be effective to manage interference and the resource pool.

In FIG. 4, a transmission UE 4-01 which camps on in operation 4-05 receives Sidelink (SL) System Information Block (SIB) from a gNB 4-03 in operation 4-10. The system information may include sidelink resource pool information for sidelink transmission and reception, parameter configuration information for a sensing operation, information for configuring sidelink synchronization, carrier information for sidelink transmission and reception in different frequencies, and the like.

When data traffic for V2X is generated in the transmission UE 4-01, an RRC connection with the gNB is established in operation 4-20. The RRC connection between the UE and the gNB may be referred to as Uu-RRC 4-20. A Uu-RRC connection process may be performed before the generation of the data traffic. The transmission UE 4-01 makes a request for transmission resources through which communication with other UEs 4-02 can be performed to the gNB in operation 4-30. Reference numeral 4-02 is reception UEs receiving data transmitted by the transmission UE. The transmission UE 4-01 may make a request for sidelink transmission resources to the gNB by using a Physical Uplink Control Channel (PUCCH), a Radio Resource Control (RRC) message, or a Medium Access Control (MAC) Control Element (CE). The MAC CE may be, for example, a Buffer Status Report (BSR) MAC CE of a new format (at least including an indicator indicating a buffer status report for V2X communication and information on the size of data buffered for D2D communication). Further, a request for sidelink resources may be made through a Scheduling Request (SR) bit transmitted through the physical uplink control channel.

The gNB 4-03 allocates V2X transmission resources to the transmission UE 4-01 through a dedicated Uu-RRC message. The message may be included in a message (for example, RRCConnectionReconfiguration) for reconfiguring parameter information for the RRC connection configuration. Information making a request for resource allocation may be a request for allocating V2X resources through Uu or resources for PC5 according to the type of traffic requested by the UE or according to whether the corresponding link is congested. For the determination, the UE may additionally transmit information on a ProSe Per Packet Priority (PPPP) or a Logical Channel ID (LDID) of V2X traffic through UEAssistanceInformation or the MAC CE. The gNB 4-03 may indicate final scheduling to the UE 4-01 by DCI transmission through the PDCCH in operation 4-40.

Subsequently, in the case of broadcast transmission, the UE 4-01 broadcasts Sidelink Control Information (SCI) to other UEs 4-02 through the PSCCH without any additional sidelink RRC configuration 4-15 in operation 4-70. Further, data is broadcasted to other UEs 4-02 through the PSSCH in operation 6-70.

Unlike this, in the case of unicast and groupcast transmission, the UE 4-01 may make the RRC connection with other UEs in one-to-one correspondence. Here, the RRC connection between UEs may be referred to as PC5-RRC 4-15 separately from Uu-RRC. In the case of groupcast, PC5-RRC 4-50 is individually connected between UEs in a group. Although FIG. 4 illustrates that the connection of PC5-RRC 4-15 is the operation after operation 4-10, the connection may be performed anytime before operation 4-10 or 4-60.

If the RRC connection is needed between UEs, the PC5-RRC connection of the sidelink is made in operation 4-50 and Sidelink Control Information (SCI) is transmitted to other UEs 4-02 through the PSCCH in a unicast manner or a groupcast manner in operation 4-60. Resource allocation information for the PSCCH/PSSCH and/or the PSFCH may be transmitted by the SCI. At this time, groupcast transmission of the SCI may be analyzed as group SCI. Further, data is transmitted to other UEs 4-02 through the PSSCH in unicast and groupcast manners in operation 4-70.

Figure 5:
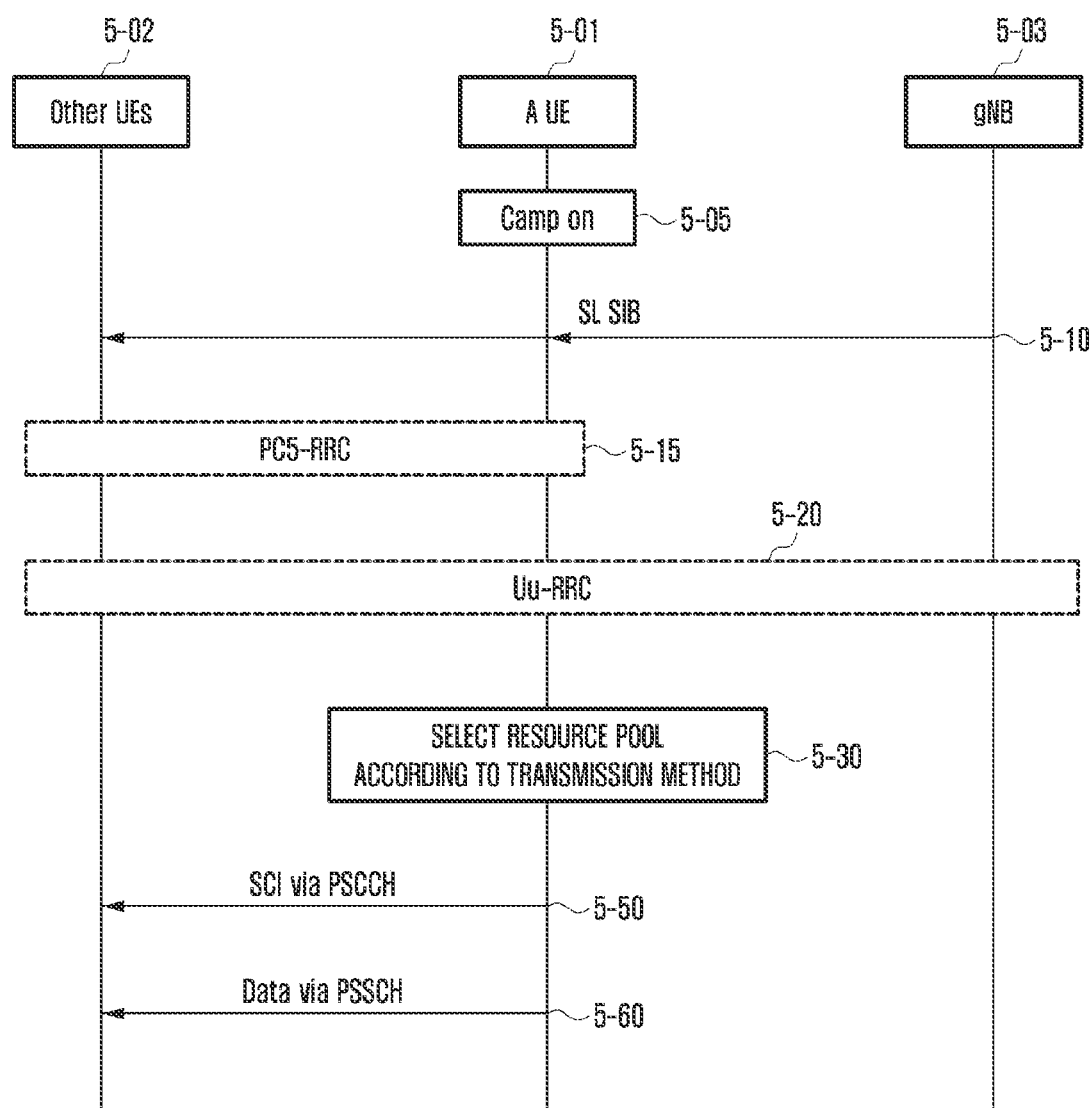
FIG. 5 illustrates an example of a UE autonomous resource allocation (mode 2) method in the sidelink in connection with an embodiment of the disclosure.

FIG. 5 illustrates an example of a method of UE autonomous resource allocation (mode 2) in the sidelink.

In UE autonomous resource allocation (mode 2), the gNB provides a sidelink transmission/reception resource pool for V2X through system information and the UE selects transmission resources according to a predetermined rule. The method of scheduled resource allocation (mode 1) in which the gNB directly involves in resource allocation is different from that of FIG. 5 in that a UE 5-01 autonomously selects resources on the basis of a resource pool pre-received through system information and transmits data.

In V2X communication, a gNB 5-03 may allocate various types of resource pools (V2X resource pool and V2P resource pool) for the UE 5-01. The resource pools may include a resource pool obtained by sensing resources used by other neighboring UEs and then autonomously selecting available resource pools by the UE and a resource pool obtained by randomly selecting resources from a preset resource pool by the UE.

The transmission UE 5-01 which camps on in operation 5-05 receives SL Sidelink System Information Block (SIB) from the gNB 5-03 in operation 5-10. The system information may include sidelink resource pool information for sidelink transmission and reception, parameter configuration information for a sensing operation, information for configuring sidelink synchronization, carrier information for sidelink transmission and reception in different frequencies, and the like. Large difference between the operations of FIGS. 4 and 5 is that the operation in FIG. 4 is performed in the state the gNB 5-03 and the UE 5-01 are RRC-connected, but the operation in FIG. 5 may performed even in an idle mode 5-20 in which RRC is not connected.

The UE may autonomously select transmission resources without direct involvement of the gNB 5-03 in resource allocation even in the RRC-connected state 5-20. The RRC connection between the UE and the gNB may be referred to as Uu-RRC 5-20. When data traffic for V2X is generated in the UE 5-01, the UE 5-01 receives a configuration of a resource pool from the gNB 5-03 through system information and selects time/frequency domain resources according to a transmission operation configured within the configured resource pool in operation 5-30.

Subsequently, in the case of broadcast transmission, the UE 5-01 broadcasts Sidelink Control Information (SCI) to other UEs 5-02 through the PSCCH without any additional sidelink RRC configuration 5-20 in operation 5-50. Further, data is broadcasted to other UEs 5-02 through the PSSCH in operation 5-60.

Unlike this, in the case of unicast and groupcast transmission, the UE 5-01 may make the RRC connection with other UEs in one-to-one correspondence. Here, the RRC connection between UEs may be referred to as PC5-RRC 5-20 separately from Uu-RRC. In the case of groupcast, PC5-RRC is individually connected between UEs in a group. Although FIG. 5 illustrates that the connection of PC5-RRC 5-15 is the operation after operation 5-10, the connection may be performed anytime before operation 5-10 or 5-50.

If the RRC connection is needed between UEs, the PC5-RRC connection of the sidelink is made in operation 5-40 and Sidelink Control Information (SCI) is transmitted to other UEs 5-02 through the PSCCH in a unicast manner or a groupcast manner in operation 5-50. Resource allocation information for the PSCCH/PSSCH and/or the PSFCH may be transmitted by the SCI. At this time, groupcast transmission of the SCI may be analyzed as group SCI. Further, data is transmitted to other UEs 5-02 through the PSSCH in unicast and groupcast manners in operation 5-60.

Figure 6:
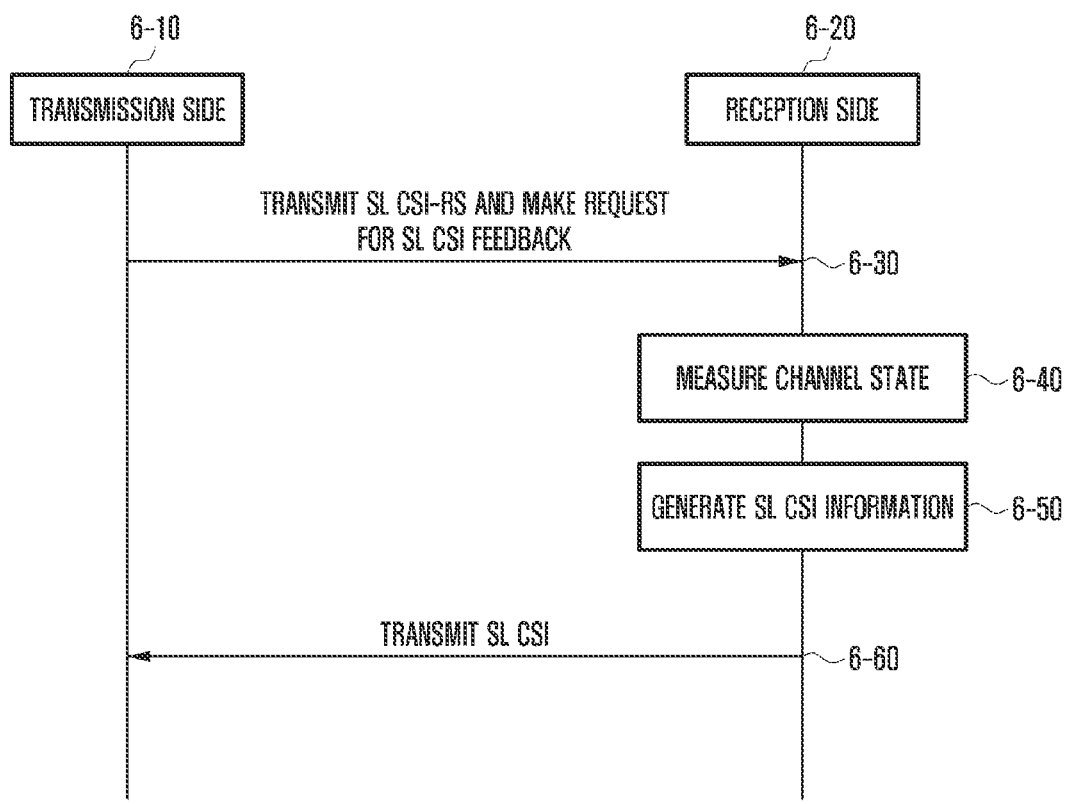
FIG. 6 illustrates an example of a function in which the reception UE measures a channel state and reports the same to the transmission UE in the sidelink in connection with an embodiment of the disclosure.

FIG. 6 illustrates an example of a function by which a reception UE measures a channel state and reports the same to a transmission UE in the sidelink.

Specifically, in FIG. 6, reference numeral 6-10 indicates a transmission side and reference numeral 6-20 indicates a reception side. In general, the transmission side and the reception side may be indicated as entities transmitting and receiving data. In the V2X system, the UE may be a transmission side or a reception side. A reception side 6-20 may be one UE or a plurality of UEs. For example, when the reception side 6-20 is a plurality of UEs, a scenario such as platooning may be executed.

A transmission UE corresponding to a transmission side transmits an SL CSI-RS to acquire channel information from the reception UE, and the reception UE corresponding to a reception side receives the same in operation 6-30. The transmission UE may make a request for SL-CSI to the reception UE. The SL CSI-RS transmission in operation 6-30 includes a method by which SL CSI-RS resources are configured and transmitted, an SL CSI-RS transmission condition, and SL CSI-RS pattern configuration methods, which are described in detail in the following embodiment. Further, an SL CSI feedback request includes a channel selection method according to a transmission channel configuration of the SL CSI and a transmission resource allocation mode (mode 1/2), an SL CSI triggering/activation method, and valid SL CSI determination methods, which are described in detail in the following embodiment.

Subsequently, the reception side measures a channel state of the sidelink by using the SL CSI-RS in operation 6-40. The reception side generates information on the SL CSI on the basis of a measurement result of the channel state in operation 6-50. In the following embodiment, an SL CSI generation method such as CQI, CQI+RI, or CQI+RI+PMI is described in detail. Particularly, a method reflecting a CBR when CQI is generated is considered.

Last, the UE corresponding to the reception side transmits a feedback of SL CSI to the UE corresponding to the transmission side in operation 6-60. An operation therefor is described in the following embodiment.

In the disclosure, SL CSI-RS transmission and an SL CSI report are limited to the case of unicast between UEs in the sidelink. In other words, the SL CSI-RS transmission and the SL CSI report are not considered in broadcast. In the case of groupcast, an SL CSI-RS transmission and SL CSI report method for groupcast is not separately considered. However, when the unicast operation between UEs in a group is possible, the SL CSI-RS transmission and SL CSI report method proposed in the disclosure may be applied.

The disclosure considers only aperiodic SL CSI-RS transmission and aperiodic SL CSI transmission. Further, transmission of a maximum of two layers is considered in multi-rank PSSCH transmission. The SL CSI may include various pieces of information. For example, information which can be included in the SL CSI may be a Channel Quality Indicator (CQI), a Precoding Matrix Indicator (PMI), a Rank Indicator (RI), a CSI-RS Resource Indicator (CRI), an SS/PBCH Block Resource Indicator (SSBRI), a Layer Indicator (LI), and an LI-BSRP. Further, information which can be included in the SL CSI may be a Channel Busy Ratio (CBR) and a Channel Occupancy Ratio (CR).

The disclosure describes a method of feeding back a CQI, a CQI-RI, or a CQI-RI-PMI as information on the SL CSI. In addition, an operation in which the reception UE transmits a feedback of CBR and CR information to the transmission UE is proposed. In order to provide SL CSI information to the transmission UE, the reception UE should receive a configuration of resource setting and reporting setting for channel state information.

Specifically, a channel state information measurement and report process between UEs in the NR sidelink system is described.

Figure 7:
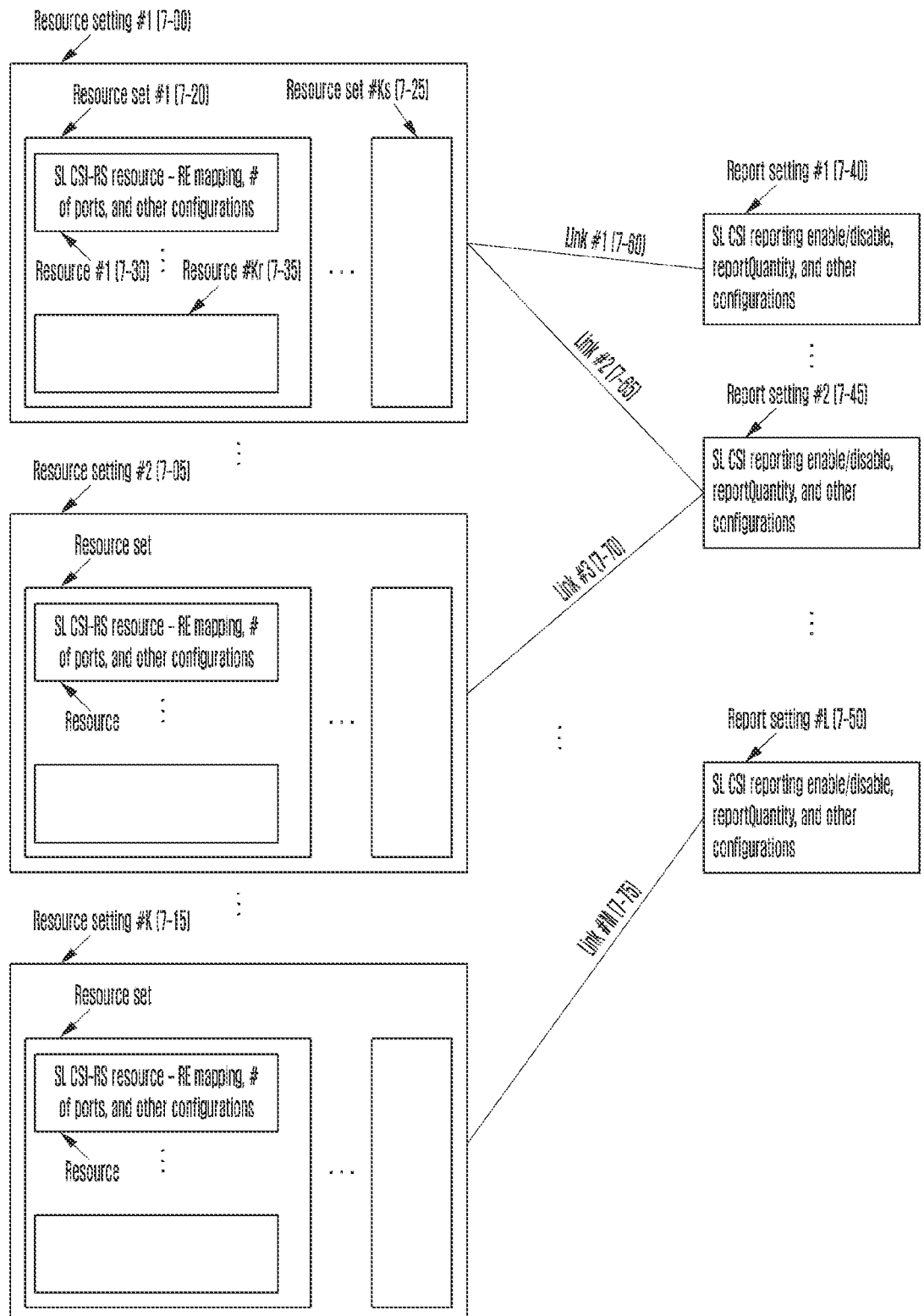
FIG. 7 illustrates a channel state information framework of the NR sidelink system in connection with an embodiment of the disclosure.

FIG. 7 illustrates a channel state information framework of the NR sidelink system according to some embodiments. A CSI framework of FIG. 7 may include two elements such as resource setting and report setting. The report setting may include at least one link with reference to an ID of the resource setting.

According to an embodiment of the disclosure, the resource setting may include information related to a Reference Signal (RS). The BS may configure at least one resource setting 7-00, 7-05, and 7-15 in the UE. Each resource setting may include at least one resource set 7-20 and 7-25. Each resource set may include at least one resource 7-30 and 7-35. Each resource 7-30 or 7-35 may include detailed information on the RS, for example, information on a transmission band (for example, a Sidelink Bandwidth Part (SL BWP)) in which the RS is transmitted, information on a location of a Resource Element (RE) in which the RS is transmitted, an RS transmission period, an offset on a time axis, and the number of RS ports. As described above, the corresponding RS may be referred to as an SL CSI-RS, and information such as the RS transmission period and the offset on the time axis may not be included when a periodic SL CSI-RS is not supported.

According to an embodiment of the disclosure, the report setting may include information related to the SL CSI report method. The BS may configure at least one report setting 7-40, 7-45, and 7-50 in the UE. At this time, in each report setting, configuration information of enabling/disabling of the SL CSI report, a type of a channel in which the report is transmitted (for example, a Physical Sidelink Shared Channel (PSSCH) or a Physical Sidelink Feedback Channel (PSFCH)), information on a band in which the SL CSI is reported (for example, SL BWP), configuration information of a codebook when a PMI is supported, a time-domain behavior for the SL CSI report, a frequency granularity for the SL CSI report, configuration information of measurement restriction, valid SL CSI window configuration information, and reportQuantity that is information included in the SL CSI may be included in parameter information of SL-CSI-ReportConfig.

Specifically, the time-domain behavior for the SL CSI report may be information indicating whether the SL CSI report is periodic or aperiodic, and only the case in which the SL CSI report is configured to be aperiodic is considered in the disclosure. The frequency granularity of the SCL CSI report is a unit on the frequency for the SL CSI report, and a non-subband-based aperiodic SL CSI report may be transmitted through a PSSCH or a PSFCH only for a frequency domain in which the corresponding PSSCH is transmitted in consideration of the transmission environment of the sidelink unlike the Uu interface between the BS and UE. The configuration information of the measurement restriction is a configuration indicating whether a time or frequency measurement interval for channel measurement is restricted when the channel is measured during the SL CSI report. In the valid SL CSI window configuration information, it may be determined that the SL CSI is not valid when the SL CSI window is exceeded in consideration of a CSI feedback delay. A relevant detailed description is made below.

Last, the reportQuantity indicates information included in the SL CSI, and the configuration of CQI, CAI-RI, or CQI-RI-PMI is considered in the disclosure. Further, CBR or CR information of the reception UE may be included in reportQuantity. At this time, the report setting may include at least one of a channel referred to by the UE in the CSI report or an ID for referring to reference signal (or RE location) information for interference measurement. This is illustrated through links 7-60, 7-65, 7-70, and 7-75.

According to an embodiment of the disclosure, when the link 7-60 connects one reporting setting 7-40 and one resource setting 7-00, the resource setting 7-00 may be used for channel measurement.

According to an embodiment of the disclosure, when the links 7-65 and 7-70 connects one reporting setting 7-45 and two resource settings 7-00 and 7-05, one of the two resource settings may be used for channel measurement and the remaining resource setting may be used for interference measurement.

According to an embodiment of the disclosure, the resource setting and the report setting may be connected to resource pools and may be (pre-)configured for each resource pool. The configuration may be indicated through a Sidelink System Information Block (SL SIB) or UE-specific higher-layer signaling.

In the case of the indication through the SL SIB, a corresponding value may be configured within resource pool information among the corresponding system information. In the case of the configuration through higher layer, the configuration may be performed through Uu-RRC or PC5-RRC. However, a configuration method for the resource setting and the report setting may vary depending on whether the UE is in an IC/PC/OOC environment in the sidelink or according to a transmission resource allocation mode (mode1/2).

It has been described that each resource setting may include at least one resource set and each resource set may include at least one resource in the channel state information framework of the NR sidelink system. Hereinafter, a condition and a method of actual transmission of the SL CSI-RS when detailed information on the SL CSI-RS is configured in each resource are described.

Prior to the description, in the case of the Uu interface between the BS and UE, the CSI-RS is transmitted over the configured entire frequency band. Further, the UE may transmit a feedback of the CSI report over the entire frequency band in the form of a wideband or a subband and the BS may receive a CSI report over the entire frequency band. However, in consideration that the V2X sidelink is communication between UEs, SL CSI-RS transmission limited to a PSSCH transmission area is considered. In other words, the SL CSI RS may be transmitted along with a PSSCH only in a frequency area to which resources are allocated through the PSSCH.

As described above, the disclosure considers aperiodic SL CSI-RS transmission. A condition of the aperiodic SL CSI-RS transmission may consider the following methods.

SL CSI-RS transmission condition
  Method 1: SL CSI-RS is transmitted along with PSSCH only when SL CSI report is enabled and actual SL CSI report is triggered/activated
  Method 2: SL CSI-RS is transmitted whenever PSSCH is transmitted if SL CSI report is enabled
  Method 3: SL CSI-RS is transmitted whenever PSSCH is transmitted if SL CSI-RS is configured through Sidelink Radio Link Monitoring (SL RLM) and SL CSI-RS is transmitted along with PSSCH only when SL CSI report is enabled and actual SL CSI report is triggered/activated if the SL CSI-RS is not configured through SL RLM As described above, the SL CSI report may be enabled/disabled separately from triggering/activating of the actual SL CSI report. It has been described that enabling/disabling of the SL CSI report may be configured in report setting of the channel state information framework of the NR sidelink system. Further, it is noted that the SL CSI report may be triggered/activated only when the SL CSI report is enabled. Various methods of triggering/activating the SL CSI report are described below again.

Specifically, method 1 is a method of transmitting the SL CSI-RS only once through the PSSCH along with signaling of triggering/activating the SL CSI report. The method of triggering/activating the SL CSI report through signaling is described below in more detail. In Method 2, the SL CSI-RS is transmitted whenever the PSSCH is transmitted when the SL CSI report is triggered/activated, and thus the SL CSI-RS is transmitted along with the PSSCH according to the frequency of discontinuous scheduling and transmission of the PSSCH when the actual SL CSI report is enabled unlike in Method 1. Accordingly, compared to method 1, it is possible to secure a larger number of SL CSI-RS samples for measuring the channel state. Method 3 is a method of determining the SL CSI-RS transmission condition according to the SL RLM.

The reception UE may perform the RLM using a reference signal transmitted by the transmission UE to determine Radio Link Failure (RLF) of the sidelink. Signals which the transmission UE can transmit for the SL RLM of the reception UE may include an SL CSI-RS, an SL DMRS (PSCCH, PSSCH, or PSBCH), and an S-SSS. A method of securing the larger number of SL CSI-RS samples, such as method 2, may be used if SL CSI-RS is configured as the reference signal for the SL RLM, and a method of transmitting the SL CSI-RS only once, such as method 1, may be used if the SL CSI-RS is not configured as the reference signal for the SL RLM.

If the SL CSI-RS is configured as the reference signal for the SL RLM, transmission in a Resource Block (RB) on a frequency on which the SL CSI-RS is transmitted or transmission through the number of subchannels larger than or equal to a predetermined number may be forced. In other words, when the SL CSI-RS is configured as the reference signal for the SL RLM, a frequency area in which the SL CSI-RS is transmitted may be secured to be larger than or equal to a predetermined area. For example, when the SL CSI-RS is configured as the reference signal for the SL RLM, the number of RBs on the frequency on which the SL CSI-RS is transmitted may be forced to be larger than or equal to 4. At this time, the SL CSI-RS is transmitted to be confined to the PSSCH. The reason why the frequency area in which the SL CSI-RS is transmitted is forced to be larger than or equal to a predetermined area is to guarantee the performance of the SL RLM.

The SL CSI-RS may be the most preferred signal among signals for the SL RLM because a pure channel value can be estimated. However, when the SL CSI-RS is not periodically transmitted and is transmitted in a small frequency area, there may be difficulty in determining a link state through channel estimation. Accordingly, the disclosure proposes a method of securing the larger number of samples on the time and frequency when the SL CSI-RS is configured as the signal for the SL RLM.

The disclosure assumes that a CSI-RS pattern in the NR Uu system is reused for an SL CSI-RS pattern. Refer to the 3GPP standard TS38.211 (Section 7.4.1.5) for the CSI-RS pattern in the NR Uu system. However, the SL CSI-RS pattern is not limited to the CSI-RS pattern in the NR Uu system in the disclosure. The SL CSI-RS pattern may be defined as a pattern in another form. For example, a Sounding Reference Signal (SRS) in the NR Uu system may be defined as the SL CSI-RS pattern or a new SL CSI-RS pattern may be designed. When the CSI-RS pattern in the NR Uu system is reused for the SL CSI-RS pattern, an available pattern may be determined according to a maximum number of SL CSI-RS ports considered in the sidelink. Further, the time and frequency location of the CSI-RS can be configured in the CSI-RS pattern in the NR Uu system, but the SL CSI-RS pattern may limit the configurable time and frequency location.

Subsequently, the channel selection method according to the configuration of the channel for transmitting the SL CSI and the transmission resource allocation mode (Mode 1/2) in the SL CSI feedback request of operation 6-30 is described. The channel for transmitting the SL CSI may consider the following methods.

SL CSI Transmission Channel
  Method 1: SL CSI piggybacks on data through PSSCH
  Method 2: SL CSI is transmitted through PSSCH without data (only SL CSI transmission)
  Method 3. SL CSI is transmitted through PSFCH In method 1 or method 2 by which the reception UE reports the SL CSI to the transmission UE through the PSSCH among the above methods, a channel selection method may vary depending on the transmission resource allocation mode (Mode 1/2). In the sidelink, the mode (Mode 1) in which the corresponding BS configures allocation of transmission resources as described with reference to FIG. 4 and the mode (Mode 2) in which the UE directly allocates transmission resources through sensing as described with reference to FIG. 5 are supported.

In Mode 1, the UE receives allocation of the PSSCH from the BS through Downlink Control Information (DCI). Accordingly, the UE may transmit resources to the PSSCH allocated by the BS in which case SL CSI information may be transmitted through the PSSCH (Method 1 or Method 2) Unlike this, in Mode 2, the UE directly selects PSSCH resources through sensing. The transmission UE informs the reception UE of transmission resource allocation information through Sidelink Control Information (SCI). Accordingly, Mode 2 may be executed not only in the IC but also in the OOC/PC environment. In Mode 2, when the reception UE transmits a feedback of the SL CSI to the transmission UE, a method by which the reception UE directly determines PSSCH resources for transmitting the SL CSI through Mode 2 sensing and resource selection and a method by which the transmission UE makes a request for a feedback of the SL CSI to the PSSCH resources determined through the Mode 2 sensing and the resource selection may be considered. A more detailed method therefor is described in more detail through embodiment 1 along with Mode 2 sensing and a resource selection method.

Method 3 is a method by which the reception UE reports the SL CSI to the transmission UE through the PSFCH. It is assumed that a PSFCH format in which the SL CSI can be transmitted for Method 3. In this case, the UE may receive allocation of PSFCH transmission resources within a resource pool. Unlike the PSSCH transmission resource allocation method, the UE may (pre-) configure PSFCH transmission resources having a period of N slots. Specifically, the preconfiguration method is a method of pre-storing the PSFCH transmission resource period N in the UE, and unlike this, the PSFCH transmission resource period N may be configured in the higher layer. When the higher layer is used, the PSFCH transmission resource period N may be configured in Uu-RRC or PC5-RRC. (Pre-) configuration of the PSFCH transmission resources may be included along with a configuration in which no PSFCH transmission resources are allocated.

When the PSSCH and the PSFCH are simultaneously supported as channels in which the SL CSI is transmitted, if the UE receiving the SL CSI does not know information on the channel in which the SL CSI is transmitted, there is uncertainty about transmission of the SL CSI through the PSSCH or the PSFCH. In order to solve the problem, two methods below may be considered.

Configuration for channel in which SL CSI Is transmitted (when both PSSCH and PSFCH are supported as channels in which SL CSI is transmitted)
  Method 1: reception UE determines whether to use PSSCH or PSFCH for transmitting feedback of SL CSI to transmission UE through 1 bit-SCI and perform signaling when transmission UE triggers/activates SL CSI report
  Method 2: reception UE signals information indicating whether SL CSI is transmitted through PSSCH or PSFCH to transmission UE through 1-bit SCI when transmitting feedback of SL CSI to transmission UE Method 1 is a method by which the transmission UE indicates a channel for the SL CSI to be received to the reception UE. Unlike this, Method 2 is a method by which the reception UE determines a channel for transmitting a feedback of the SL CSI and informs the transmission UE of the channel. Compared to Method 1, Method 2 has an advantage in that the UE performing a feedback can directly determine a channel suitable for the feedback from among currently valid feedback channels.

As described above, a method of transmitting the SL CSI through a sidelink MAC-CE may be considered unlike the method of directly transmitting the SL CSI through a physical channel. When the SL CSI is transmitted through the MAC-CE, it is not required to define a method of mapping the SL CSI to a physical channel. In other words, CSI information may be included through the MAC-CE of the higher layer of the UE, and the SL CSI may be transmitted through PSSCH resources allocated by the BS in Mode 1 and may be transmitted through PSSCH resources selected by the UE in Mode 2. However, unlike the method of directly transmitting the SL CSI through the physical channel, CSI information may be transmitted to the higher layer of the UE and mapped to the MAC-CE, and then transmitted again through the physical channel, and thus a delay may be additionally generated in the CSI report.

Unlike the channel state information framework in the Uu interface between the BS and the UE, there may be difficulty during a process in which the transmission UE makes a request for the SL CSI report and the reception UE performs the SL CSI report in the channel state information framework of the NR sidelink system. Specifically, in Mode 1, the UE may transmit SL CSI information to PSSCH resources allocated by the BS (see SL CSI transmission channel method 1 or method 2). When the reception UE does not receive allocation of PSSCH resources from the BS on time although the transmission UE makes a request for the SL CSI report, the SL CSI report of the reception UE may be late. In Mode 2, when the reception UE transmits a feedback of the SL CSI to the transmission UE, a method by which the reception UE directly determines PSSCH resources for transmitting the SL CSI through Mode 2 sensing and resource selection and a method by which the transmission UE makes a request for a feedback of the SL CSI to the PSSCH resources determined through the Mode 2 sensing and the resource selection may be considered. In Mode 2, available PSSCH resources may be not allocated on time even when the reception UE transmits a feedback of the SL CSI to the transmission UE. In order to solve the problem, a valid SL CSI window configuration method below may be considered.

Valid SL CSI Window Configuration Method
  Method 1: when the valid SL CSI window is configured in the transmission UE and it is determined that it is difficult to receive a feedback of the SL CSI from the reception UE within the SL CSI window, no SL CSI request is made or, when the SL CSI window is exceeded, no feedback is received from the reception UE Method 2: when valid SL CSI window is configured in reception UE and SL CSI window is exceeded, SL CSI report is not transmitted to transmission UE It has been described that the valid SL CSI window can be configured in report setting of the channel state information framework in the NR sidelink system. As described above, the valid SL CSI window may be connected to a resource pool and (pre-)configured for each resource pool. Further, the valid SL CSI window may be configured through Uu-RRC or PC5-RRC. In addition, the SL CSI window may be configured in units of slots. The SL CSI window may reflect feedback delay requirements to be configured. Accordingly, the term of SL CSI window may be referred to as the term of latency bound for the SL CSI report. Therefore, it is noted that the term of SL CSI window may be differently named. Like in Method 1 and Method 2, the SL CSI window may be separately configured for the transmission UE and the reception UE, and the SL CSI window may be configured in common for the transmission UE and the reception UE.

Method 1 may determine whether PSSCH resources are valid to receive a feedback of the SL CSI on the basis of the valid SL CSI window when the transmission UE makes a request for the feedback of the SL CSI to the PSSCH resources determined through Mode 2 sensing and resource selection in Mode 2. For example, when the valid PSSCH resources do not satisfy the feedback delay, the SL CSI request may not be made. When the SL CSI window is exceeded on the basis of the valid SL CSI window, the transmission UE may determine that no feedback is received from the reception UE.

In Method 2, when a transmission time point of PSSCH allocated by the BS in Mode 1 or PSSCH resources selected to transmit the SL CSI through sensing and resource selection in Mode 2 exceeds the SL CSI window on the basis of the valid SL CSI window and thus the feedback delay is not satisfied, the reception UE may not report the SL CSI to the transmission UE. As described above, when the valid SL CSI window is operated, the SL CSI request and report may be more effectively managed in the sidelink.

When both the PSSCH and the PSFCH are supported as channels in which the SL CSI is transmitted and the reception UE may select the channel through which the SL CSI is reported to the transmission UE, the UE reporting the SL CSI may use a method of selecting and transmitting a channel for more rapid transmission among valid PSSCH and PSFCH resources. The reception UE may inform the transmission UE of information indicating which channel is selected and transmitted when the SL CSI is reported to the transmission UE using the corresponding channel through SCI.

A more detailed UE operation for operating the valid SL CSI window proposed above is described below by way of example. In the following example, the term of latency bound for the SL CSI report may be used instead of the term of valid SL CSI window.

The latency bound for the SL CSI report may be converted into a slot within a range of 3 to 20 ms and configured. Specifically, the latency bound for the SL CSI report may be configured within a slot range of $3*2\mu \sim 20*2\mu$ in consideration of Subcarrier Spacing (SCS). Here, p denotes an index corresponding to numerology and may be configured as the following value according to SCS.

SCS=15 kHz, $\mu$=0
SCS=30 kHz, $\mu$=1
SCS=60 kHz, $\mu$=2
SCS=120 kHz, $\mu$=3

Subsequently, the following methods may be considered as a method of configuring the latency bound for the SL CSI report.

Method 1: latency bound X is (pre-)configured for each resource pool within range of 3 to 20 ms Method 2: UE may select latency bound X within range of 3 to 20 ms; selected latency bound may be configured through PC5-RRC.

Method 3: Y (3 ms≤Y≤20 ms) is (pre-)configured for each resource pool; UE may select latency bound X within range of Y to 20 ms. Further, selected latency bound may be configured through PC5-RRC.

First, Method 1 is a method by which the configuration of the latency bound X can be controlled by the network. When Method 1 is applied, the UE in the resource pool should perform the SL CSI report to satisfy X configured in the resource pool.

Method 2 is a method by which the UE directly selects the latency bound X. This may be selected by UE implementation. At this time, the selection may be directly performed by the UE performing the SL CSI report and the UE triggering the SL CSI report. If the corresponding UE is the transmission UE triggering the SL CSI report, the transmission UE may configure the selected X through PC5-RRC. In other words, the corresponding configuration value may be transmitted between the transmission UE and the reception UE in a PC5-RRC set-up stage. Then, the UE performing the SL CSI report should perform the SL CSI report to satisfy the latency bound by using the value configured through PC5-RRC.

Method 3 is a method obtained by combining Method 1 and Method 2. In Method 2, the UE directly selects the latency bound X, and thus congestion within the resource pool may increase when all UEs within the resource pool selects a very small X value for a rapid SL CSI feedback. Accordingly, Method 3 is a method in which the configuration of Y (3 ms≤Y≤20 m) can be controlled by the network. Next, the UE may select the latency bound X within a range of Y to 20 ms. Accordingly, the UE may select the latency bound X according to Y configured by the network.

When the latency bound X for the SL CSI report is determined through the method, the UE should perform the SL CSI report to satisfy the same. Refer to the operation of Mode 1 and the operation of Mode 2 proposed in the disclosure for a method of receiving allocation of resources satisfying the latency bound X. However, when the UE reporting the SL CSI does not receive allocation of resources satisfying the latency bound X after receiving an indication of triggering the CSI report, the UE may not expect an operation of performing the SL CSI report. In other words, the SL CSI report may not be performed. However, when receiving allocation of the resources satisfying X, the UE may perform the SL CSI report through the proposed [SL CSI transmission channel] or the sidelink MAC-CE. At this time, information included in the SL CSI may be a CQI and an RI. In the disclosure, information included in the SL CSI is not limited to the CQI and RI information.

As described above, when the SL CSI is transmitted to the PSSCH or the PSFCH, a non-subband-based aperiodic SL CSI report that is transmitted only for a frequency area corresponding to the PSSCH transmitted by the transmission UE is considered as the SL CSI report. While the CSI-RS is transmitted over the entire band and the CSI is reported after it is determined whether to use a wideband PMI/CQI for reporting one PMI or CQI for the corresponding entire frequency band or a subband PMI/CQI for dividing the corresponding frequency band into a plurality of subbands and then reporting one PMI for every subband in the Uu interface between the BS and the UE, the non-subband-based aperiodic SL CSI report is used in the sidelink because the sidelink corresponds to communication between UE and UE and the SL CSI-RS is not transmitted over the entire band but is transmitted in the PSSCH only within a frequency domain to which the transmission UE allocates resources through the PSSCH as described above.

As described above, the disclosure considers aperiodic SL CSI transmission. The SL CSI report may be enabled/disabled separately from triggering/activating of the aperiodic SL CSI report. It has been described that enabling/disabling of the SL CSI report may be configured in report setting of the channel state information framework of the NR sidelink system. Further, it is noted that the SL CSI report may be triggered/activated only when the SL CSI report is enabled. The following various methods of triggering/activating the SL CSI report may be considered.

SL CSI Report Triggering/Activation Method

Method 1: SL CSI report is automatically triggered/activated when SL CSI report is enabled Method 2: SL CSI report is enabled and SL SCI report is triggered/activated by CSI Method 3: SL CSI report is enabled and SL CSI report is triggered/activated by MAC CE Method 4: SL CSI report is triggered/activated when SL HARQ-ACK report is enabled and reception UE transmits NACK to transmission UE X times (≥1)

Method 5: SL CSI report is triggered/activated when RSRP value which reception UE reports to transmission UE is smaller than threshold X Method 6: SL CSI report is triggered/activated when SL CSI report is enabled and CSI-RS transmission is configured Method 7: SL CSI report triggered/activated when SL CSI report is enabled and timer configured by reception UE is terminated Method 1, Method 4, Method 5, and Method 7 are methods by which the transmission UE does not induce additional signaling to trigger/activate the SL CSI report to the reception UE. Method 2, Method 3, and Method 6 are methods by which the transmission UE uses additional signaling to trigger/activate the SL CSI report to the reception UE, Method 2 is a method using the SCI, Method 3 is a method using the MAC CE, and Method 6 is a method of triggering/activating the SL CSI report as an implicit method.

Method 6 is a method of determining whether the SL CSI report is indirectly triggered/activated according to whether the CSI-RS transmission is configured, and the CSI-RS transmission configuration may be included in the configuration for the SL CSI-RS within the resource set in the resource setting of the channel state information framework in the NR sidelink system. Unlike this, the CSI-RS transmission configuration may be performed through the SCI or the MAC CE. Method 6 is a method of triggering/activating the SL CSI report when SL CSI-RS transmission is configured and thus the SL CSI-RS is transmitted.

In Method 2, the SCI format for triggering/activating the SL CSI report may be designated to be the same as the general SCI format or designed to be different therefrom. As the expanded form of Method 4, a method by which an SL HARQ-ACK report is enabled in sidelink groupcast and only a UE transmitting an NACK X (≥1) times among UEs in a group triggers/activates the SL CSI report may be used.

Method 7 is a method of triggering/activating the SL CSI report when the SL CSI report is enabled and a timer configured by the reception UE is terminated. When the timer configured by the reception UE is consistent and is always newly started after the SL CSI report, it may belong to a periodic SL CSI report method. However, when the timer configured by the reception UE is not consistently configured and is not always started after the SL CSI report, it may be an aperiodic SL CSI report method.

Subsequently, a method of transmitting a feedback of CQI, CQI+RI, or CQI+RI+PMI as SCL CSI information is described. When the number of pieces of SL CSI information is one or more, there may be dependency between the pieces of SL CSI information. Specifically, when the UE transmit a feedback of CQI+RI, the CQI is calculated on the basis of the RI (see the following second embodiment for other cases). It is assumed that the CQI and the RI are always reported along with the report of CQI+RI in the disclosure. When the UE transmits a feedback of CQI+RI+PMI, the CQI is calculated on the basis of the reported or determined PMI and RI. Hereinafter, a method of generating the SL CSI through definition of the CQI in the sidelink and definition of the CSI reference resource is described in more detail. First, the CQI in the sidelink may be defined as follows.

SL CQI

The UE 6-20 corresponding to the reception side in the sidelink induces each CQI value reported in slot n to the highest CQI index that satisfies the following condition in operation 6-60.

One PSSCH TB transport block including a combination of a modulation scheme, a target code rate, and a transport block size corresponding to a CQI index may be received to not exceed the transport block error probability. The PSSCH TB transport block occupies a sidelink physical resource block or subchannels named as SL CSI reference resources.

0.1, the case in which a cqi-Table in SL-CSI-ReportConfig indicates "table 1" ([Table 1] below) or "table 2" ([Table 2] below) through a higher-layer configuration 0.00001, the case in which a cqi-Table in SL-CSI-ReportConfig indicates "table 3" ([Table 3] below) through a higher-layer configuration The highest CQI index in the CQI definition may be selected in consideration of a Channel Busy Ratio (CBR). A more detailed method is described in more detail through embodiment 3. When the target transport block error probability is configured as 0.1, the target transport block error probability is configured to use [Table 1] below ('table 1') or [Table 2] below ('table 2').

[Table 1] ('table 1') or [Table 2] ('table 2') is a CQI table designed in consideration of the target transport block error probability of 0.1, and QPSK, 16QAM, and 64QAM are considered for modulation in [Table 1] ('table 1') and QPSK, 16 QAM, 64 QAM, and 256 QAM are considered for modulation in [Table 2] ('table 2'). If 256QAM is supported in the sidelink, [Table 1] ('table 1') or [Table 2] ('table 2') may be configured as described to configure and use the corresponding CQI table according to whether 256 QAM is used or not. However, 256QAM is not supported in the sidelink, only [Table 1] ('table 1') may be supported to be configurable.

Unlike this, [Table 3] ('table 3') is a CQI table designed to consider the target transport block error probability of 0.00001, and QPSK, 16 QAM, and 64 QAM are considered for modulation. As described above, the reason why two target transport block error probabilities of 0.1 and 0.00001 are considered is that service requirements may be different. In the NR sidelink, PC5 5QIs (PQI) for various QoS requirements are defined, and the PQI includes a default priority level, a packet delay budget, a packet error rate, a default maximum date burst volume, and a default averaging window. The packet error rate may be configured as various values between 10^-1 and 10^-5.

As described above, the two target transport block error probabilities of 1 and 0.00001 may be configured and used for operation, but more subdivided target transport block error probability configuration as well as 1 and 0.00001 may be supported. For example, when the configuration of a target transport block error probability of 0.001 is additionally introduced, a CQI table corresponding thereto may be additionally defined.

TABLE 1

| CQI index | modulation | code rate × 1024 | efficiency |
| --- | --- | --- | --- |
| 0 | | out of range | |
| 1 | QPSK | 78 | 0.1573 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 2

| CQI index | modulation | code rate × 1024 | efficiency |
| --- | --- | --- | --- |
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 3

| CQI index | modulation | code rate × 1024 | efficiency |
| --- | --- | --- | --- |
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |

TABLE 3-continued

| CQI index | modulation | code rate × 1024 | efficiency |
| --- | --- | --- | --- |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

Subsequently, the CSI reference resource in the sidelink may be defined as follows.

SL CSI Reference Resource Definition

When the UE 6-20 corresponding to the reception side in the sidelink generates SL CSI information in operation 6-50, the SL CSI reference resource may be defined as follows.

The SL CSI reference resource in the frequency domain is defined by a physical resource block corresponding to a band inducing the SL CSI or a group of subchannels.

Figure 9:
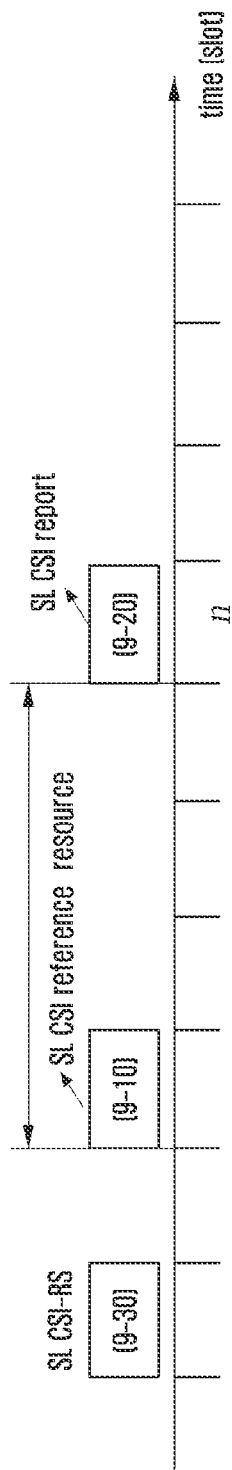
FIG. 9 illustrates an example of a process in which the UE generates SL CSI information in connection with an embodiment of the disclosure.

The CSI reference resource 9-10 in the time domain is defined as slot $n-n_{CSIref}$ when the channel state information report is performed in sidelink slot n as indicated by reference numeral 9-20. Refer to FIG. 9 for a relevant description.

$n_{CSIref}$ for an aperiodic SL CSI report $n_{CSIref}$ indicates a sidelink slot in which a CSI request is transmitted when the channel state information report is configured to be transmitted in a slot that is the same as the sidelink slot in which an SL CSI request is transmitted, In the other cases, $n_{CSIref}$ may be longer than or equal to a time required when the UE calculates the CSI and may be a value corresponding to a sidelink slot closest to n.

According to an embodiment of the disclosure, when reporting channel state information, the UE may report channel state information measured on the basis of the CSI-RS resource 9-30 at a time point that is the same as or before a time point of the CSI reference resource corresponding to the corresponding channel state information. The relevant operation may be determined by configuration information for measurement restriction in CSI report setting of the channel state information framework in the NR sidelink system. The channel state may be measured using only the CSI-RS resource at the time point that is the same as the CSI reference resource when measurement restriction is configured, and the channel measurement may be performed using all of the CSI-RS resources at the time point that is the same as or before the time point of the CSI reference resource when the measurement restriction is not configured.

When a report of the CQI index is configured in the SL CSI reference resource, the UE corresponding to the reception side in the sidelink may assume some or all of the following information to induce the CQI index.

A OFDM symbols are used as control channels.
B OFDM symbols are used as AGC symbols.
C OFDM symbols are used as GPs.
The number of PSSCHs and DMRS symbols is D.
An SCS which is the same as an SL BWP is configured for PSSCH reception.
The reference resource uses a CP length and the SCS configured for PSSCH reception.
No RE is used as an SSB.
A value of RV is 0.

EPREs of a PSSCH and a CSI-RS are the same as each other.

No RE is allocated to an NZP CSI-RS or a ZP CSI-RS.

It is assumed that the number of front-loaded DMRS symbols is one and the number of additional DMRSs is a value configured by the SCI or resource pool.

It is assumed that a PSSCH symbol does not include a DMRS.

It is assumed that a PRB bundling size is 2 PRBs.

PSSCH transmission may be performed by a maximum of two transmission layers. In order to calculate the CQI index, the UE assumes that PSCCH transmission of [0, v−1] corresponding to v layers is performed by [0, . . . , P−1] antenna ports as shown in the following equation.

$$\begin{bmatrix} y^{(0)}(i) \\ \ldots \\ y^{(p-1)}(i) \end{bmatrix} = W(i) \begin{bmatrix} x^{(0)}(i) \\ \ldots \\ x^{(v-1)}(i) \end{bmatrix}$$

$x(i)=[x^{(0)}(i) \ldots x^{(v-1)}(i)]^T$ denotes a vector for a PSSCH symbol. P denotes the number of SL CSI-RS ports. If one CSI-RS port is configured, W(i) is 1. When reportQuantity of SL-CSI-ReportConfig is configured as 'CQI-RI-PMI', W(i) is a precoding matrix corresponding to a reported PMI which can be applied. When reportQuantity of SL-CSI-ReportConfig is configured as 'CQI' or 'CQI-RI', W(i) is an identity matrix scaled as 1/sqrt(v) by the number of layers corresponding to v.

The assumption for the use of time domain resources of the slot for measuring the sidelink CQI index may be made by the following example. When the report of the CQI index is configured in the SL CSI reference resource, the UE corresponding to the reception side in the sidelink assumes the following information to induce the CQI index.

[Assumption Set 1]

First two OFDM symbols in a slot are used as control channels.

The number of PSSCHs and DMRS symbols in a slot is 8.

One OFDM symbol is used as a GP.

Two OFDM symbol are used as PSFCHs.

One OFDM symbol is used as a GP.

Alternatively, assumption set 2 below may be applied.

[Assumption Set 2]

First two OFDM symbols in a slot are used as control channels.

The number of PSSCHs and DMRS symbols in a slot is 11.

One OFDM symbol is used as a GP.

Assumption set 1 may be for the case in which there are resources occupied by the PSFCH in the slot, and assumption set 2 may be for the case in which there are no resources occupied by the PSFCH in the slot. Whether to use assumption set 1 or assumption set 2 as the assumption used when the UE measuring and reporting the CSI generates the CSI may be determined according to the resource pool configuration, or may be determined according to PC5-RRC or a bit field of the SCI. Alternatively, it may be determined according to whether there are PSFCH resources in the slot in which the sidelink CSI-RS is transmitted. That is, assumption set 1 is applied when there are PSFCH resources in the slot in which the CSI-RS is transmitted, and assumption set 2 is applied when there are PSFCH resources in the slot in which the CSI-RS is transmitted.

In another example, a method of generating CSI feedback information including the CQI index on the basis of the structure of the slot in which the sidelink CSI-RS is actually transmitted may be performed on the basis of the assumption for the use of time domain resources of the slot for measuring the sidelink CQI index. Since the PSSCH is always transmitted when the CSI-RS is transmitted in the sidelink, it is possible to generate the CQI index on the basis of the use and the assumption of actual mapping resources such as the number of symbols occupied by the PSSCH in the slot in which the CSI-RS is transmitted, frequency resources, and the like.

Embodiment 1

Embodiment 1 of the disclosure proposes a method of performing sensing in the situation in which periodic and aperiodic traffics coexist and selecting transmission resources therethrough for UE autonomous resource allocation (Mode 2) in the V2X sidelink. In addition, in Mode 2, when the reception UE transmits a feedback of the SL CSI to the transmission UE, a method by which the reception UE directly determines PSSCH resources for transmitting the SL CSI through Mode 2 sensing and resource selection and a method by which the transmission UE makes a request for a feedback of the SL CSI to the PSSCH resources determined through the Mode 2 sensing and the resource selection may be considered. Embodiment 1 of the disclosure describes the UE operation therefor in more detail.

First, sensing may be defined as an operation of performing Sidelink Control Information (SCI) decoding for another UE and an operation of performing sidelink measurement. The operation of performing the SCI decoding for another UE includes an operation in which another UE acquires SCI information after the SCI is successfully decoded. The transmission resource selection may be defined as an operation of determining resources for sidelink transmission on the basis of the sensing result. A process of reselecting transmission resources may be performed according to the state of the sidelink.

In the disclosure, a sensing window A and a sensing window B are defined to effectively perform the sensing in the situation in which periodic and aperiodic traffics coexist.

Figure 8:
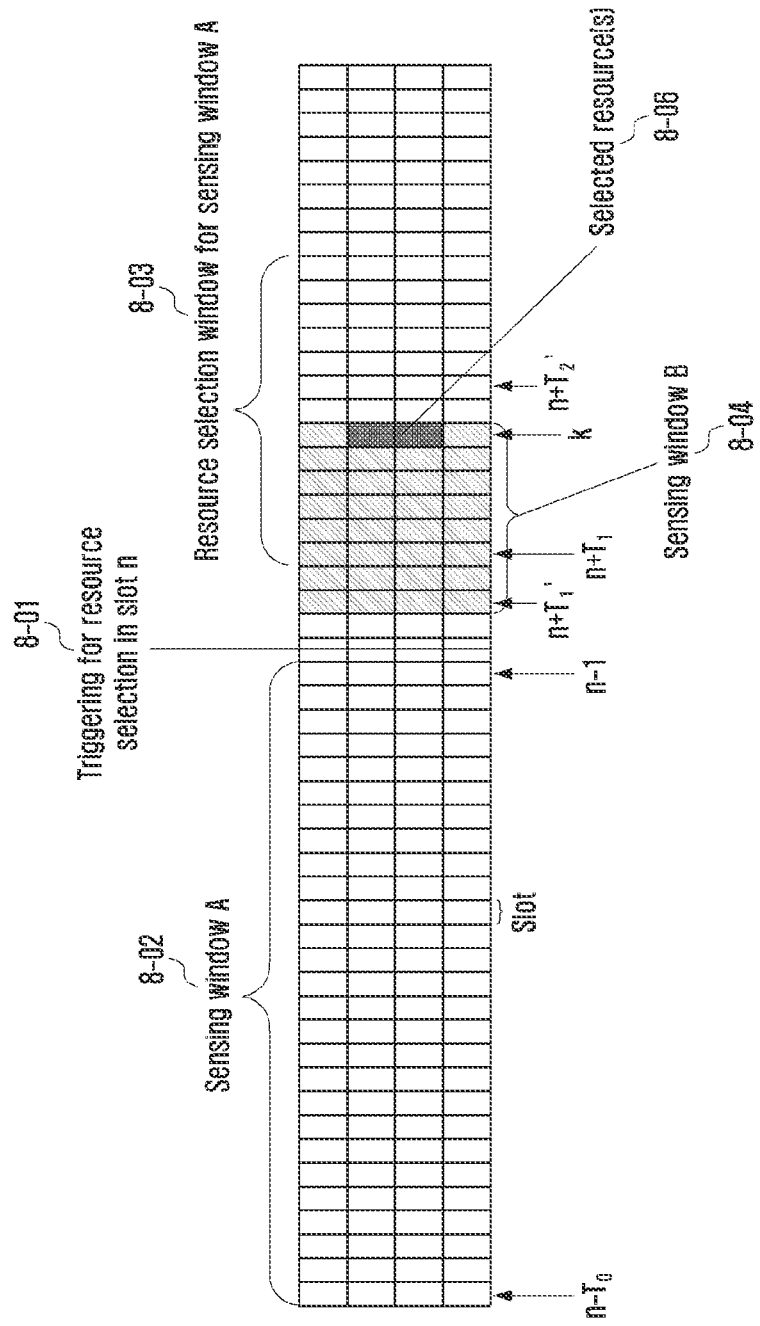
FIG. 8 illustrates an example of a method of configuring a sensing window A and a sensing window B for UE autonomous resource allocation (Mode 2) of the sidelink in connection with an embodiment of the disclosure.

FIG. 8 illustrates an example of a method of configuring the sensing window A and the sensing window B for UE autonomous resource allocation (Mode 2) of the sidelink. When data to be transmitted is generated, the UE may perform sensing during a configured sensing window interval and select transmission resources on the basis of the result thereof.

As illustrated in FIG. 8, when triggering for selecting transmission resources is generated in slot n as indicated by reference numeral 8-01, the sensing window A 8-02 may be defined as follows.

The sensing window A may be defined as a slot interval of $[n-T_0, n-1]$. $T_0$ may be determined as a fixed value or determined to be configurable.

In an example of the case in which $T_0$ is determined as a fixed value, $T_0=1000*2\mu$ for periodic traffic. Unlike this, a fixed value of $T_0=100*2\mu$ may be configured for aperiodic traffic. The fixed value $T_0$ in the above example may be changed to another value according to a considered traffic characteristic, and may be fixed to the same value for periodic and aperiodic traffic. $\mu$ is an index corresponding to numerology and may be configured as the following value according to Subcarrier Spacing (SCS).
SCS=15 kHz, µ=0
SCS=30 kHz, µ=1
SCS=60 kHz, µ=2
SCS=120 kHz, µ=3

The configuration for the case in which the $T_0$ is determined to be configurable may be indicated through a Sidelink System Information Block (SL SIB) or UE-specific higher-layer signaling. In the case of the indication through the SL SIB, a corresponding value may be configured within resource pool information among the corresponding system information. Information allocating the resource pool may include many parameters and a value corresponding to $T_0$ may be included. When $T_0$ is configured within resource pool information, it means that constant $T_0$ is always used within the corresponding resource pool.

SCI decoding and sidelink measurement for another UE may be performed in the sensing window A.

Resource allocation information for another UE and QoS information for a packet may be acquired from SCI information acquired after the SCI is successfully decoded within the sensing window A. The resource allocation information may include a reservation interval of resources. The QoS information may be priority information according to latency, reliability, a minimum required communication range for transmitted traffic, a data rate requirement, and the like. Location information of another UE may be acquired from the received SCI. A TX-RX distance may be calculated from location information of another UE and my location information.

Sidelink Reference Signal Received Power (SL RSRP) may be measured from SCI information acquired after the SCI is successfully decoded within the sensing window A. The SL RSRP may be obtained by measuring average received power (in [W]) of the DMRS for the PSSCH corresponding to the SCI from the SCI acquired after the SCI is successfully decoded. In another method, the SL RSPR may be obtained by measuring average received power (in [W]) of the DMRS for the PSSCH including the SCI.

A Sidelink Received Signal Strength Indicator (SL RSSI) may be measured within the sensing window A. The SL RSSI denotes a received signal strength and indicates how much power (in [W]) is received by the reception UE, and is observed by valid OFDM symbol locations within the sidelink slot and a configured subchannel.

The sensing window A may be mainly used to determine resources for UE autonomous resource allocation (Mode 2) through periodic traffic sensing. When periodic resource allocation information of another UE is detected through the SCI decoding and it is determined that allocating transmission resources to resources to be used by another UE on the basis of the sidelink measurement result such as the SL RSRP or the SL RSSI is not effective, the corresponding resources may be excluded from the resource selection window 8-03.

As illustrated in FIG. 8, when triggering for selecting transmission resources is generated in slot n as indicated by reference numeral 8-01, the resource selection window 8-03 may be defined as follows.

The resource selection window may be defined as a slot interval of $[n+T_1, n+T_2]$. $T_1$ and $T_2$ may be determined as fixed values or determined to be configurable. Unlike this, $T_1$ and $T_2$ may be determined within a fixed range and the UE may configure appropriate values within the fixed range in consideration of implementation.

In an example in which $T_1$ and $T_2$ may be determined within a fixed range and the UE may configure appropriate values within the fixed range in consideration of implementation, $T_1$ and $T_2$ may be configured within $T_1 \leq 4*2^\mu$ and $20*2^\mu \leq T_2 \leq 100*2^\mu$ by UE implementation. µ is an index corresponding to numerology.

Final transmission resources 8-05 may be selected within the resource selection window on the basis of the result of selecting performed in the sensing window A. When it is determined that allocating transmission resources to resources to be used by another UE on the basis of the sidelink measurement result such as the SCI decoding and the SL RSRP or the SL RSSI in the sensing window A is not effective, the corresponding resources may be excluded from the resource selection window 8-03.

If the sensing is performed using only the sensing window A and transmission resource selection is performed therethrough as illustrated in FIG. 8, the following transmission resource selection method may be used.

Transmission resource selection method-1
Step-1: the number Mtotal of resource candidates for resource allocation is determined on the basis of resource pool information configured within the resource selection window 6-03.
Step-2: resources of which the occupancy and use by another UE is ineffective within the resource selection window 6-03 on the basis of the sensing result in the sensing window A 6-02 are excluded and X ($\leq$Mtotal) resources in the resource candidates for resource allocation are left.
Step-3: a resource candidate list including X resources is reported through higher layer of the UE, and final transmission resources are randomly selected from among the X candidates by the higher layer of the UE as indicated by reference numeral 8-05.

Subsequently, as illustrated in FIG. 8, when triggering for selecting transmission resources is generated in slot n as indicated by reference numeral 8-01, the sensing window B 8-04 may be defined as follows.

The sensing window B may be defined as a slot interval of $[n+T_1', n+T_2']$. $T_1'$ and $T_2'$ may be determined as fixed values or determined to be configurable. Unlike this, $T_1'$ and $T_2'$ may be determined within a fixed range, and the UE may configure appropriate values within the fixed range in consideration of implementation. When k indicates a finally selected slot, the sensing window B is suspended in the slot k in which case the sensing window B is $[n+T_1', k]$.

$T_1'$ and $T_2'$ may be configured to have values that are the same as or different from $T_1$ and $T_2$ of the resource selection window 8-03.

For example, in the case of $T_1'=0$, sensing is performed from a triggering slot n for selecting transmission resources.

The sensing window B may be configured as one slot or one or more slots by the configured values of $T_1'$ and $T_2'$.

SCI decoding and sidelink measurement for another UE may be performed in the sensing window B.

The operation of performing the SCI decoding and the sidelink measurement in the sensing window B may be analyzed that the sensing window A is expanded to a location after the slot n when the sensing window A is operated together.

In the sensing window B configured after the triggering slot n for selecting transmission resources, the operation of performing the sidelink measurement for the slot to which actual transmission resources can be allocated may be analyzed as an operation of sensing aperiodic traffic which cannot be predicted in the sensing window A.

Performing the sensing through the sensing window B may be understood as an operation of performing sensing for traffic sensed in every slot regardless of whether traffic is periodic or aperiodic.

If the sensing is performed using only the sensing window B and transmission resource selection is performed therethrough as illustrated in FIG. 8, the following transmission resource selection method may be used.

Transmission resource selection method-2
- Step-1: it is determined whether the corresponding resources are idle (when the resources are not occupied by another UE) through sensing in the corresponding slot within the sensing window B 8-04.
  - An allocation unit of resources on the frequency may be defined as A (≥1) subchannels or all subchannels. The number Ntotal(≥1) of resource candidates for resource allocation within the corresponding slot may be determined according to the allocation unit of the resources on the frequency.
  - Sensing may be performed through SCI decoding and sidelink measurement.
- Step-2-1: if it is determined that the corresponding resources are idle through sensing in step-1, final transmission resources 8-05 are determined from among the Ntotal(≥1) resource candidates for resource allocation within the slot.
- Step-2-2: if it is determined that the corresponding resources are all busy (when the resources are occupied by another UE) through sensing in step-1, the following operation may be selected.
  - If the next slot is configured as the sensing window B 8-04, step-1 is performed in the next slot.
  - If the next slot is not configured as the sensing window B 8-04, the following operation may be considered.
    - When transmission should be performed in the current slot by QoS requirements, the final transmission resources 8-05 are determined using the energy detection result. The QoS information may be priority information according to latency, reliability, a minimum required communication range for transmitted traffic, a data rate requirement, and the like.
    - Otherwise, transmission in the current slot may be canceled and a backoff operation may be performed.

As defined through FIG. 8, the sensing window A and the sensing window B may be divided on the basis of the time point at which triggering for selecting transmission resources is transmitted. Specifically, a sensing interval configured before the triggering slot n for selecting transmission resources may be defined as the sensing window A and a sensing interval configured thereafter may be defined as the sensing window B.

If the sensing is performed using both the sensing window A and the sensing window B and transmission resource selection is performed therethrough in FIG. 8, the following transmission resource selection method may be used.

Transmission resource selection method-3
- Step-1: the number Mtotal of resource candidates for resource allocation is determined on the basis of resource pool information configured within the resource selection window 8-03.
- Step-2: resources of which the occupancy and use by another UE is ineffective within the resource selection window 8-03 on the basis of the sensing result in the sensing window A 8-02 are excluded and X (≤Mtotal) resources in the resource candidates for resource allocation are remained.
- Step-3: a resource candidate list X is reported to UE higher layer, and higher layer randomly down-selects Y (≤X) candidates from among X candidates.
- Step-4-1: when the sensing window B 8-04 is included in the resource selection window 8-03, the UE selects final transmission resources 8-05 by transmission resource selection method-2 on the basis of the sensing result of the sensing window B 8-04 in the physical layer among Y candidates determined in the higher layer.
  - The case in which the sensing window B 8-04 is included in the resource selection window 8-03 corresponds to the case of [n+$T_1$, k] in FIG. 8. Such a condition may be determined by the configuration of $T_1$ and $T_2$, and $T_1'$ and $T_2'$.
- Step-4-2: when the sensing window B is not included in the resource selection window 8-03, the physical layer selects the final transmission resources 8-05 by transmission resource selection method-2 on the basis of the sensing result in the sensing window B.
  - The case in which the sensing window B 8-04 is not included in the resource selection window 8-03 corresponds to the case of [n+$T_1'$, n+$T_1$−1] in FIG. 8. Such a condition may be determined by the configuration of $T_1$ and $T_2$, and $T_1'$ and $T_2'$.

The step (step-3) in which the higher layer selects Y candidates is omitted in transmission resource selection method-3, and the following method may be used.

Transmission resource selection method-4
- Step-1: the number Mtotal of resource candidates for resource allocation is determined on the basis of resource pool information configured within the resource selection window 8-03.
- Step-2: resources of which the occupancy and use by another UE is ineffective within the resource selection window 8-03 on the basis of the sensing result in the sensing window A 8-02 are excluded and X (≤Mtotal) resources in the resource candidates for resource allocation are remained.
- Step-3-1: when the sensing window B 8-04 is included in the resource selection window 8-03, the UE selects the final transmission resources 8-05 by transmission resource selection method-2 on the basis of the sensing result of the sensing window B 8-04 in the physical layer among X candidates.
  - The case in which the sensing window B 8-04 is included in the resource selection window 8-03 corresponds to the case of [n+$T_1$, k] in FIG. 8. Such a condition may be determined by the configuration of $T_1$ and $T_2$, and $T_1'$ and $T_2'$.
- Step-3-2: when the sensing window B is not included in the resource selection window 8-03, the physical layer selects the final transmission resources 8-05 by transmission resource selection method-2 on the basis of the sensing result in the sensing window B. The case in which the sensing window B 8-04 is not included in the resource selection window 8-03 corresponds to the case of [n+T$_1$', n+T$_1$-1] in FIG. 8. Such a condition may be determined by the configuration of T$_1$ and T$_2$, and T$_1$' and T$_2$'.

When the sensing window A and the sensing window B are configured at the same time, the final resource selection may be determined by the resource selection window 8-03 and the sensing window B 8-04. Transmission resource selection method-3 and transmission resource selection method-4 proposed above are methods of configuring the sensing window A and the sensing window B at the same time, performing sensing in a situation in which periodic and aperiodic traffics coexist, and optimizing selection of transmission resources therethrough.

Transmission resource selection methods 1/2/3/4 may be explicitly configured and managed by the BS. Specifically, the transmission resource selection method may be connected to resource pools and (pre-)configured for each resource pool. The configuration may be indicated through a Sidelink System Information Block (SL SIB) or UE-specific higher-layer signaling. In the case of the indication through the SL SIB, a corresponding value may be configured within resource pool information among the corresponding system information. In the case of the configuration through the higher layer, which transmission resource selection method is used may be indicated through Uu-RRC or PC5-RRC.

Implementation of the operation of performing sensing and selecting transmission resources in UE autonomous resource allocation (Mode 2) of the sidelink may be performed through various methods. For example, when the sensing window A and the sensing window B are configured at the same time, if triggering of selecting transmission resources is generated in slot n while the UE always senses the sensing window A, the UE may select final transmission resources by sensing the sensing window B. However, as described above, since the operation in which the UE always senses the sensing window A can directly use the sensing result of the sensing window A anytime, there may be an advantage in an aspect of latency of selecting transmission resources but there may be a disadvantage in an aspect of UE energy consumption.

Accordingly, in another method, when traffic to be transmitted is generated, the UE may directly sense the sensing window A, and then sense the sensing window B after triggering of selecting transmission resources is generated in slot n, so as to select final transmission resources. The later method has an advantage of minimizing UE energy consumption by performing sensing only when needed but also has a disadvantage in the aspect of latency of selecting transmission resources.

The method by which the UE performs sensing for UE autonomous resource allocation (Mode 2) in the V2X sidelink and selects transmission resources therethrough has been described above. Subsequently, a method by which, when measuring a channel state and reports the same to the transmission UE, the reception UE selects resources for the CSI report in Mode 2 is described. As described above, the CSI repot may be transmitted through the PSSCH. At this time, the case in which only the CSI information is included in the PSSCH is considered. In addition, a method of transmitting the CSI through PSFCH resources may be considered. The method of Mode 2 sensing and transmission resource selection described above may be applied not only to select PSSCH resources but also select PSFCH resources.

However, the Mode 2 sensing and transmission resource selection method in the disclosure may be used to select the PSSCH resources, and the PSFCH resources correspond to PSFCH transmission resources that the UE may receive within the resource pool as described above. It is assumed that a PSFCH format for transmitting the SL CSI is defined. Unlike the PSSCH transmission resource allocation method, the UE may (pre-) configure PSSCH transmission resources having a period of N slots. Further, the UE may perform the CSI report in the configured PSSCH resources and the corresponding slot. In the case in which, when measuring a channel state and reporting the same to the transmission UE, the reception UE uses the PSSCH as resources for the CSI report in Mode 2, the following methods may be considered.

Methods of Performing a CSI Report Through a PSSCH in Mode 2

Method 1: the reception UE directly determines PSSCH resources for transmitting the SL CSI through Mode 2 sensing and resource selection.

Method 2: the reception UE transmits the SL CSI through the PSSCH resources determined by the transmission UE through Mode 2 sensing and resource selection.

Method 1 is a method by which the reception UE directly selects and transmits PSSCH resources through the Mode 2 sensing and resource selection method described above to transmit the SL CSI and Method 2 is a method by which the reception UE transmits a feedback of the SL CSI to the PSSCH resources configured by the transmission UE through Mode 2 sensing and resource selection. For Method 2, the transmission UE should reserve one or more resources through Mode 2 sensing and resource selection and may indicate the time and frequency location of resources to receive the CSI report among the resources reserved by the transmission UE through the SCI when the transmission UE triggers/activate the CSI report. When the frequency location of transmission resources are fixedly configured to use all allocated subchannels, the transmission UE can inform the reception UE of only the time location of the resources to receive the CSI report.

Embodiment 1-1

Embodiment 1-1 of the disclosure proposes another method of performing sensing in the situation in which periodic and aperiodic traffics coexist and selecting transmission resources therethrough for UE autonomous resource allocation (Mode 2) in the V2X sidelink. Compared to embodiment 1, there is difference in a detailed operation. Further, the following method may be applied to the case in which the UE operating in Mode 2 selects resources for the SL CSI report. Specifically, an upper bound T2 of a resource selection window may be determined in the following detailed operation in order to satisfy a latency bound for the SL CSI report.

Figure 10A:
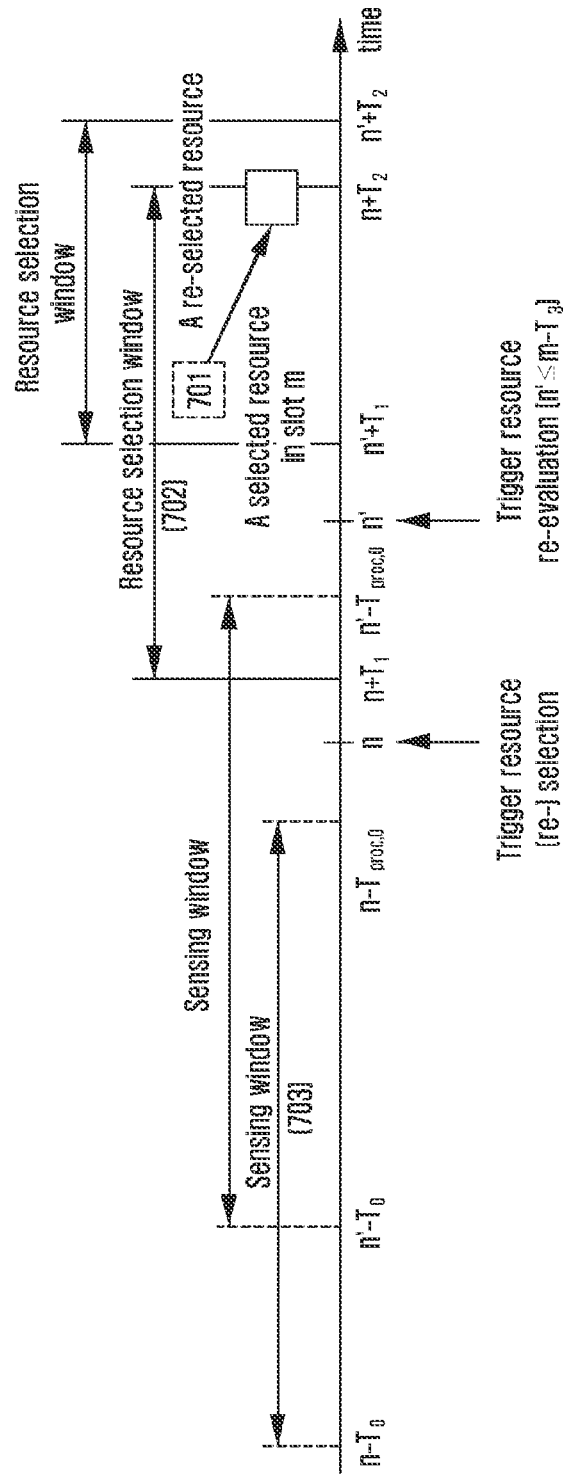
FIG. 10A illustrates a sensing window and a resource selection window required by the Mode 2 UE to perform resource (re-)selection and re-evaluation according to an embodiment of the disclosure.
Figure 10B:
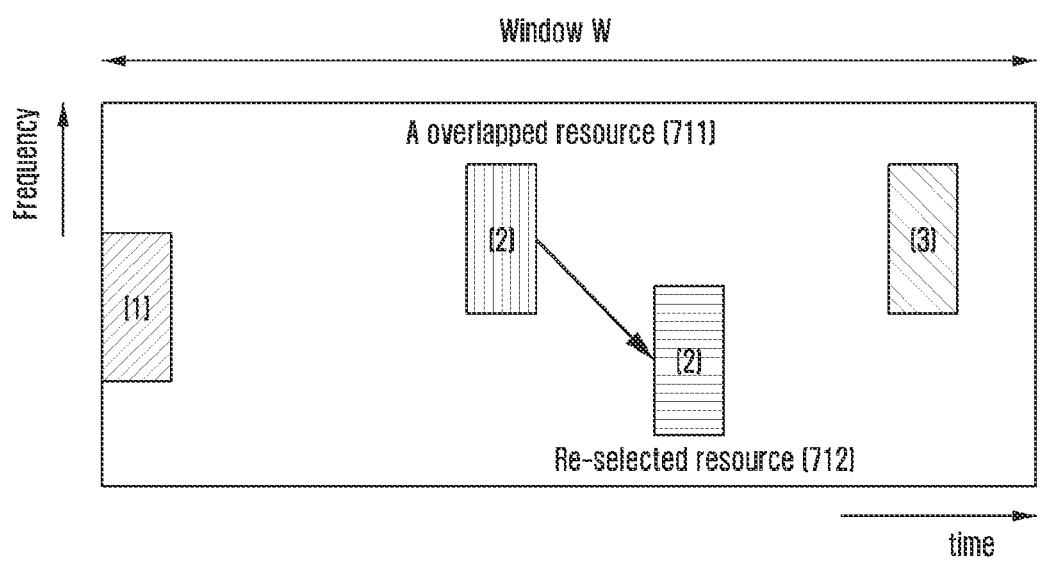
FIG. 10B illustrates a sensing window and a resource selection window required by the Mode 2 UE to perform resource (re-)selection and re-evaluation according to an embodiment of the disclosure.
Figure 10C:
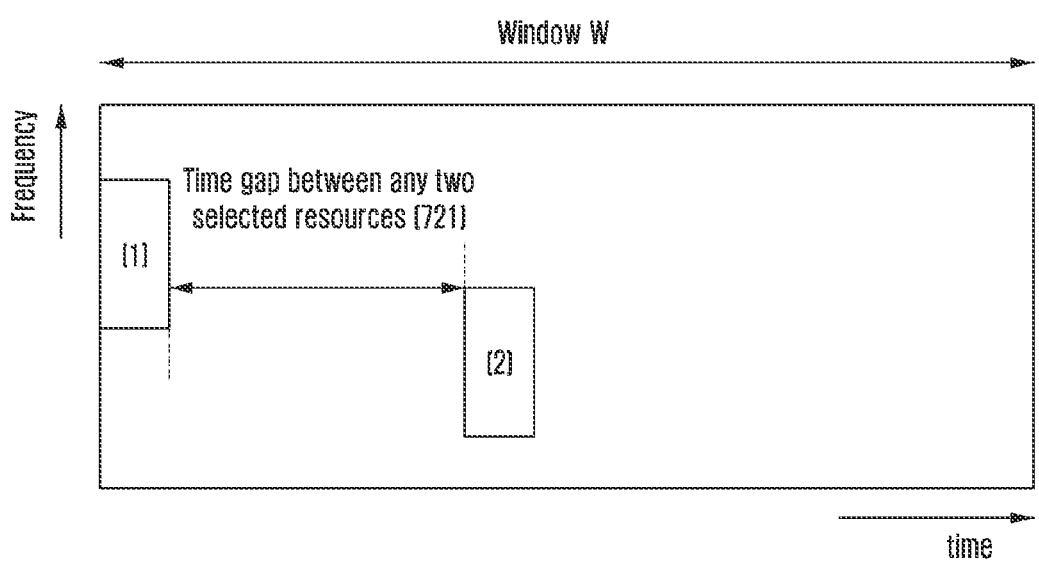
FIG. 10C illustrates a sensing window and a resource selection window required by the Mode 2 UE to perform resource (re-)selection and re-evaluation according to an embodiment of the disclosure.

FIGS. 10A, 10B, and 10C illustrate definition of a sensing widow and a resource selection window required for (re-)selecting and re-evaluating resources by the UE in Mode 2 according to an embodiment of the disclosure.

Specifically, FIG. 10A illustrates an example in which triggering for resource (re-)selection is performed at a time point n, and triggering for re-evaluation is performed at n' (n'>n) through continuous sensing after the (re-)selection triggering time point n.

Referring to FIG. 10A, it may be assumed that triggering of resource (re-)selection is performed at the time point n. A condition for triggering resource (re-)selection may correspond to the case in which one of the following conditions is satisfied.
- When there is no configured sidelink grant, or
- When the configured sidelink grant cannot provide a resource allocation space for RLC SDU transmission although Radio Link Control (RLC) Service Data Unit (SDU) is scheduled to be transmitted without segmentation, or
- When the current configured sidelink grant does not satisfy a latency requirement for data in a logical channel, or
- When a resource pool is configured or reconfigured by RRC, or
- When pre-emption is enabled in the resource pool and some of resources reserved by the pre-emption are released In the case of the pre-emption, whether to enable or disable the pre-emption may be (pre-) configured in the resource pool. The operation in which the UE preempts resources when the pre-emption is enabled in the resource pool may be an operation in which the UE releases some of the reserved resources after the resources are reserved through sensing and resource selection.

Specifically, referring to FIG. 10B, when resources reserved by another UE through $1^{st}$ SCI decoding overlap some of the resources reserved by the UE as indicated by reference numeral 711, a priority of another UE is higher than a priority of the UE which is the transmission UE and, when SL-RSRP of the overlapping resources is larger than a relevant SL-RSRP threshold, the UE may release the overlapping resources 711 for the already reserved resources. At this time, resource reselection may be triggered and thus new resources 712 may be reselected. At this time, the priority of the transmission UE may be information indicated by the SCI. The application of the pre-emption may be applied only to overlapping resources. The resource reselection procedure may be performed according to the following [resource (re-)selection procedure]. Refer to the following [condition of performing the pre-emption] for a more detailed description.

When the resource (re-)selection triggering time point is earlier than a time point n, and a re-evaluation condition is satisfied at a time point n' (n'>n) before reservation of selected resources is signaled through the SCI after the information. A value of $T_0$ which can be (pre-)configured may be X=100 ms or Y=1000 ms. The disclosure does not limit X and Y configured as $T_0$ to specific values. In an embodiment, X may be $T_0$ supported when a reservation interval is configured to be equal to or lower than X ms, and Y may be $T_0$ supported when a reservation interval is configured to be larger than X ms.

For example, when the reservation interval is configured as 1000 ms, $T_0$ may limit the configuration of X=100 ms. This is because, when T0 is configured as X=100 ms in the case in which the reservation interval is configured to be higher than 100 ms, a signal transmitted according to a period higher than 100 ms may not be sensed. Further, $T_{proc,0}$ may be defined as a time required for processing the sensing result, and required $T_{proc,0}$ may vary depending on configured $T_0$. Specifically, when long $T_0$ is configured, long $T_{proc,0}$ may be needed. On the other hand, when short $T_0$ is configured, short $T_{proc,0}$ may be needed. Accordingly, in an embodiment, $T_{proc,0}$ may be fixed to one value but another value controlled by configured $T_0$ may be (pre-)configured. For example, when $T_0$ is configured as X=100 ms, $T_{proc,0}$=0.1 ms. When T0 is configured as Y=1000, $T_{proc,0}$=1 ms. Unlike this, $T_{proc,0}$=1 ms may be fixed regardless of configured $T_0$.

Unlike this, since various Subcarrier Spacings (SCSs) are supported in the NR sidelink, a method of determining $T_{proc,0}$ according to the SCS may be considered. Specifically, a method of defining $T_{proc,0}$ as 1 slot when the SCS is configured as {15, 30} kHz, and (pre-)configuring $T_{proc,0}$ as one of {1, 2} slots when the SCS is configured as {60, 120} kHz may be considered. Unlike this, a method of defining $T_{proc,0}$ as 1 slot when the SCS is configured as {15, 30, 60} kHz, and (pre-)configuring $T_{proc,0}$ as one of {1, 2} slots when the SCS is configured as {120} kHz may be considered. The reason why the configuration of 1 slot is possible even when the higher SCS is used is that $T_0$ is configured as X=100 ms and short $T_{proc,0}$ can be processed even in the high SCS. For example, the sensing window may be defined as follows by $T_0$ and $T_{proc,0}$. Hereinafter, $T_0$ is one of values of X or Y and may be a (pre-)configured value. Further, $T_{proc,0}$ may be a value according to the SCS through the higher layer as described above. In addition, $t_0^{SL}$, $t_1^{SL}$, ..., $t_{T_{max}}^{SL}$ may be defined as a set of slots belonging to the sidelink resource pool. According to definition of [Table 4] below, the sensing window may be a configured interval obtained by converting $T_0$ (ms) configured before the slot n into a logical slot belonging to the resource pool.

TABLE 4

The UE shall monitor slots $t_{n'-T_0}^{SL}$, $t_{n'-T_0+1}^{SL}$, ..., $t_{n'-Tproc, 0}^{SL}$ except for those in which its transmission occur, where $t_{n'}^{SL}$ = n if slot n belongs to the set $(t_0^{SL}, t_1^{SL}, ..., t_{Tmax}^{SL})$, otherwise slot $t_{n'}^{SL}$ is the first slot after slot n belonging to the set $(t_0^{SL}, t_1^{SL}, ..., t_{Tmax}^{SL})$ where $T_0$ is defined above and $T_{proc, 0}$ is from higher layer parameter t0_processing.

resources are selected, triggering for resource (re-)selection may be generated again. Refer to the following [method of supporting a re-evaluation triggering operation], [time point at which the UE triggers re-evaluation of selected resources], and [re-evaluation triggering condition] for a more detailed description.

When triggering for the resource (re-)selection is performed at the time n, the sensing window may be defined as [n−$T_0$, n−$T_{proc,0}$]. $T_0$ is a start time point of the sensing window and may be (pre-)configured as resource pool Subsequently, when triggering for resource (re-)selection is performed at the time point n, the resource selection window may be determined as [n+$T_1$, n+$T_2$]. T1 may be selected by UE implementation for $T_1 \le T_{proc,1}$. $T_{proc,1}$ is a maximum reference value considering a processing time required for selecting resources, and the processing time may vary depending on UE implementation. For example, values of Alt 1 to Alt 7 shown in [Table 5] below may be used as the value of $T_{proc,1}$ according to SCS. That is, [Table 5] shows $T_{proc,1}$ configured in units of slots.

TABLE 5

| μ | Alt 1 | Alt 2 | Alt 3 | Alt 4 | Alt 5 | Alt 6 | Alt 7 |
|---|---|---|---|---|---|---|---|
| 0 | 4 | 4 | 2 | 2 | 2 | 3 | 3 |
| 1 | 8 | 4 | 4 | 4 | 4 | 3 | 6 |
| 2 | 16 | 6 | 8 | 6 | 6 | 4 | 12 |
| 3 | 32 | 8 | 16 | 8 | 8 | 5 | 18 |

In [Table 5], Alt 1 indicates the case in which the value of $T_{proc,1}$ is fixed to 4 ms, and Alt 3 indicates the case in which the value of $T_{proc,1}$ is fixed to 2 ms. Alt 7 may indicate the case in which the value of $T_{proc,1}$ is fixed to 3 ms. The remaining cases are examples of the case in which the value of $T_{proc,1}$ is differently configured in units of slots. In the disclosure, the value configured as $T_{proc,1}$ is not limited to the above presented values. Accordingly, a value equal to or smaller than $T_{proc,1}$ may be selected as $T_1$ by UE implementation. $T_1$ may be defined in units of slots. When it is assumed that Nmax resources can be selected for one TB, initial transmission and retransmission resources may be included in the Nmax resources.

At this time, the UE may select $T_2$ within a range that satisfies $T_2 \leq$ Remaining Packet Delay Budget (PDB). $T_2$ may be selected within a range that satisfies $T_2 \geq T_{2\ min}$. In the case of $T_{2\ min}$>Remaining PDB, T2 min=Remaining PDB. In other words, T2 min≤T2≤Remaining Packet Delay Budget (PDB). $T_{2\ min}$ is to prevent the UE from selecting $T_2$ that is a too small value. $T_{2\ min}$ may be defined as a function of a priority of the transmission UE. The priority of the transmission UE may be information indicated by the SCI. '$T_{2\ min}$ (priority)' that is $T_{2\ min}$ according to the priority may be configured in the higher layer. For example, $T_{2\ min}$ may be selected from the following set. $T_{2\ min}$_set={1, 5, 10, 20}*2μ. μ is an index corresponding to numerology and may be configured as the following values according to Subcarrier Spacing (SCS).

SCS=15 kHz, μ=0

SCS=30 kHz, μ=1

SCS=60 kHz, μ=2

SCS=120 kHz, μ=3

Subsequently, a re-evaluation operation through continuous sensing even after triggering for the resource (re-)selection is performed at the time point n may be considered. When triggering for resource (re-)selection is performed at the time point n and it is determined that selected resources are not suitable for transmission through continuous sensing after transmission resources are selected, triggering for changing the already selected resources at a time point n' (n'>n) may be defined as re-evaluation. The operation in which the UE triggers re-evaluation for the selected resources at the time point n' (n'>n) after the time point n at which triggering for the resource (re-)selection is performed may be performed when the following condition is satisfied.

The case in which the UE does not reserve resources selected through triggering of the resource (re-)selection.

At this time, the reservation for resources may be analyzed as an operation of transmitting information on the selected resources through a 1$^{st}$ SCI. Accordingly, the condition may be defined as a time point before the information on the selected resources is transmitted through the SCI. Further, the following methods may be considered as a method of supporting the re-evaluation triggering operation.

[Method of Supporting Re-Evaluation Triggering Operation]

Method 1: UE implementation

Method 2: default operation of UE

Method 2: enabling/disabling may be (pre-)configured in the resource pool.

Specifically, Method 1 may be a method of supporting whether to support triggering of the re-evaluation for selected resources by the UE through UE implementation. Accordingly, whether to perform the re-evaluation may vary depending on the UE. Method 2 and Method 3 may be methods of specifying the operation in which the UE triggers the re-evaluation for selected resources. Method 2 may be a method of specifying the necessary performance of the re-evaluation triggering operation, and Method 3 may be a method of (pre-)configuring enabling/disabling in the resource pool and allowing the re-evaluation triggering operation only in the enabled resource pool.

Since whether to support re-evaluation triggering may vary depending on implementation when Method 1 is used, improvement of the performance of Mode 2 operation for avoiding collision of resource transmission may be limited. Accordingly, it may be assumed that Method 2 or Method 3 is used in the disclosure.

Referring to FIG. 10A, for a slot m 701 that is a time point at which at least already selected resources are transmitted, the UE may perform triggering for re-evaluation only before a slot m-$T_3$. At this time, a change in the selected resources through re-evaluation may be limited to already selected resources at the time point m. $T_3$ may be a processing time required for reselection.

As a first method, a method of using the processing time $T_1$ for selecting resources already selected according to UE implementation as $T_3$ may be considered ($T_3=T_1$). However, an additional processing time for resource selection may be required in the re-evaluation process. Specifically, not only a time for dropping previously selected resources but also a time required for, when the previous resources overlap new resources, processing the overlapping may be needed. Accordingly, a method of configuring $T_3=T_{proc,1}$ may be considered. This is because $T_{proc,1}$ is a maximum reference value considering the processing time required for selecting resources and thus, when re-evaluation triggering is performed before the corresponding value, the change from the selected resources to other resources may be possible on the implementation.

Unlike this, a method of configuring $T_3=T_1+X$ may be considered. A value of X may be defined as ms or defined in units of slots. For example, when X is defined in units of slots, X=1 slot. In the disclosure, the value of X is not limited to the above example. Accordingly, the following method may be considered for a time point at which the UE triggers re-evaluation for selected resources.

[Time Point at which UE Triggers Re-Evaluation for Selected Resources]

Method 1. UE implementation

Method 2: UE triggers re-evaluation in all slots n' (n'>n) before m-$T_3$

Method 3: UE triggers re-evaluation in one last slot n' corresponding to a slot before m-$T_3$.

Specifically, Method 1 may be a method of supporting the operation in which the UE triggers re-evaluation for selected resources through UE implementation without specifying the operation. For example, Method 1 may be defined as follows. [Table 6] below assumes $T_3=T_1+1$ as described above. Further, m may be defined as a slot in which resources are selected through resource (re-)selection triggering at the time point n. According to the following definition, Method 1 may be selected by UE implementation from among time points that satisfy n'≤m−T$_3$.

TABLE 6

After resource (re-)selection is triggered in slot n by higher layer, the UE shall trigger resource re-evaluation in slot n' > n. The triggering moment n' for re-evaluation is up to UE implementation under n' ≤ m − T$_3$ where T$_3$ = T1 + 1 slots and m is the corresponding slot that resource is selected by resource (re-)selection procedure.

Method 2 or Method 3 is a method of specifying the operation in which the UE triggers re-evaluation for selected resources, and Method 2 is a method by which the UE triggers re-evaluation in all slots n'(n'>n) before m−T$_3$ and may generate a plurality of re-evaluations according to the length of n'−n.

However, Method 3 is a method in which the UE triggers re-evaluation in one last slot n' corresponding to a slot before m−T$_3$ and may remove the disadvantage of Method 2. Since whether to support re-evaluation triggering may vary depending on implementation when Method 1 is used, improvement of the performance of Mode 2 operation for avoiding collision of resource transmission may be limited. Accordingly, it is assumed that Method 2 or Method 3 is used in the disclosure.

As illustrated in FIG. 10A, in the case in which triggering for re-evaluation is generated at n' (n'>n), the sensing window therefor is [n'−T$_0$, n'−T$_{proc,0}$], and the resource selection window therefor may be determined as [n'+T$_1$, n'+T$_2$]. At this time, T$_0$ and T$_{proc,0}$ may have the same values as those used when triggering for resource (re-)selection is performed at the time point n. However, for T$_1$ and T$_2$, the UE may select the same values as those used when trigger for resource selection is performed at the time point n but may select other values by implementation.

Subsequently, an operation in which the UE performs sensing in the sensing window is described. First, sensing may be defined as an operation of performing Sidelink Control Information (SCI) decoding for another UE and an operation of performing sidelink measurement. The operation of performing the SCI decoding for another UE may include an operation of acquiring SCI information of another UE after the SCI is successfully decoded. At this time, the SCI is information corresponding to a 1$^{st}$ SCI and may be acquired through detection of a PSCCH. The 1$^{st}$ SCI may include the following information related to resource allocation.

[Condition for Triggering Re-Evaluation]

Subsequently, the condition in which the UE triggers re-evaluation may be defined as shown in [Table 7] below. According to the following definition, for only first selected initial transmission resources (resources before reservation of selected resources is signaled through the SCI) after previous resource (re-)selection triggering is performed at the time point n and resources are selected, if RSRP of the corresponding resources is larger than an RSRP threshold configured in the current re-evaluation process, it is determined that the re-evaluation condition is satisfied and thus the re-evaluation may be triggered. In other words, triggering for resource (re-)selection may be generated again at the time point n' (n'>n).

TABLE 7 the RSRP measurement for a resource of the selected sidelink grant for the first new transmission opportunity from the previous (re)selection procedure is higher than the RSRP threshold in the current re-evaluation procedure.

When re-evaluation is triggered according to the condition in [Table 7], the UE may report resource candidates selected by the [resource (re-)selection procedure] to the higher layer. Referring to FIG. 10A, the sensing window and the resource selection window may be determined on the basis of the time point n' (n>n). Further, in a detailed description of the "only first selected initial transmission resources", the resources may correspond to initial transmission resources for one TB when Method 1 (Dynamic reservation) is applied with reference to the following [Mode 2 resource reservation method]. When Method 2 (semi-persistent reservation) is applied, the resources may correspond to initial transmission resources for transmitting the first TB even when resources for a plurality of TBs are reserved.

[Condition for Performing Pre-Emption]

Subsequently, a detailed example in which the UE performs pre-emption may be presented through [Table 8]. First, when pre-emption is enabled in the resource pool and conditions a), b), and c) shown in [Table 8] below are all satisfied, the UE may trigger pre-emption, release some of the reserved resources and reselect the released resources. In [Table 8] below, SCI format 0-1 may be a 1$^{st}$ stage SCI. According to [Table 8] below, the UE may receive the 1$^{st}$ stage SCI and detect resource reservation information including priority information (prio$_{RS}$) of another UE and resource reservation period information (P$_{rsvp,RX}$) in the condition a). In the condition b), an RSRP measurement value detected from the received 1$^{st}$ stage SCI may be larger than an RSRP threshold (Th$_{Pre}$(prio$_{RX}$)). Th$_{pre}$(prio$_{RX}$) is a value that determines pre-emption and may be configured as a value independent from the SL-RSRP threshold configured in the [resource (re-)selection procedure].

Specifically, the SL RSRP threshold Th$_{a,b}$ may be configured as Th$_{priTX,PriRX}$ according to a priority level. PriTX may be a priority of the transmission UE, and b may be a priority of another UE detected from the received 1$^{st}$ stage SCI. Refer to the following [L1 SL RSRP measurement method] for a detailed description of RSRP measurement. Subsequently, the condition c) may present a condition for the case in which resources reserved by another UE overlap some of the resources reserved by the UE through 1$^{st}$ stage SCI decoding.

TABLE 8

If a resource pre-emption is enabled in resource pool, the UE shall trigger the pre-emption if it meets all the following conditions:
    a) the UE receives an SCI format 0-1 in slot $t_m^{SL}$, and "Resource reservation period" field, if present, and "Priority" field in the received SCI format 0-1 indicate the values $P_{rsvp\_RX}$ and $prio_{RX}$, respectively
    b) the RSRP measurement performed for the received SCA format 0-1, is higher than $Th_{Pre}(prio_{RX})$.
    c) the SCA format received in slot $t_m^{SL}$. or the same SCI format which, if and only if the "Resource reservation period" field is present in the received SCI format 0-1, is assumed to be received in slot(s) $t_{m+P'_{rsvp\_RX}}^{SL}$ determines the set of resource blocks and slots which overlaps with a resource of the configured sidelink grant for transmission opportunity. Here, $P'_{rsvp\_RX}$ is $P_{rsvp\_RX}$ converted to units of logical slots, If the condition in [Table 8] is satisfied, pre-emption is triggered and some of the reserved resources are released, and when the released resources are reselected, the resource reselection method may be performed according to the following [resource (re-)selection procedure].
    [Resource Allocation Information of 1$^{st}$ SCI]
    Priority (QoS value)
    PSSCH resource assignment (frequency/time resource for PSSCH)
    Resource reservation period (if enabled)
        Refer to Method 2 of the following [Mode 2 resource reservation method]
    PSSCH DMRS pattern (if more than one patterns are (pre-)configured)
        When one or more PSSCH DMRS patterns are (pre-)configured, the UE may select a PSSCH DMRS pattern and indicate the same through the SCI.
    Number of PSSCH DMRS port(s)

Sidelink measurement is to determine whether another UE occupies resources in time and frequency resources in which the transmission UE performs transmission and accordingly, the following measurement method may be considered in the sidelink.
    [L1 SL RSRP Measurement Method]
    PSCCH Reference Signal Received Power (RSRP): measures average received power (in [W]) for DMRSs included in the PSCCH
    PSSCH Reference Signal Received Power (RSRP): measures average received power (in [W]) for DMRSs included in the PSSCH Specifically, the UE may measure PSCCH RSRP by monitoring a DMRS area of the PSCCH related to the 1$^{st}$ SCI. Further, the UE may decode the 1$^{st}$ SCI, detect PSSCH information connected thereto from the 1$^{st}$ SCI information, monitor a PSSCH DMRS area, and measure PSSCH RSRP. The PSCCH RSRP and the PSSCH RSRP may be named L1 SL RSRP. One of the PSCCH RSRP or the PSSCH RSRP may be (pre-)configured to be selected as L1 SL RSRP in the resource pool information.

Subsequently, the resource (re-)selection procedure of the UE in the resource selection window is described. Specifically, two steps may be defined.
[Resource (Re-)Selection Procedure]
    Step 1: operation of identifying candidate resources for resource selection in resource selection window
    Step 2: operation of selecting resources for transmission from among identified resource candidates First, step 1 is an operation of discovering candidate resources for resource selection in the resource selection window. In the resource candidates, one resource candidate for PSSCH transmission in the resource selection window 702 may be defined as $R_{x,y}$ as illustrated in FIG. 10A. The resource pool on the time and frequency used for sidelink transmission and reception has been described with reference to FIG. 3. $R_{x,y}$ indicates one resource candidate including x+j successive subchannels in a subchannel area configured as the resource pool for a slot $t_y$ belonging to the resource pool. Here, j=0, . . . , $L_{subCH-1}$, and $L_{subCH}$ is a subchannel length for resource allocation and may be selected within a resource allocation range transmitted through system information.

The number of all resource candidates within the resource selection window 702 may be defined as A. B (≤A) resource candidates for resource allocation may be left except for resource candidates determined to be inefficient for allocation of PSSCH transmission resources on the basis of the sensing result in the sensing window 703 Here, B=A*X/100. X may be fixed to one value within a range of 0≤X≤100, and one of a plurality of values of X may be (pre-)configured in the resource pool. For example, X=20.

A detailed process of selecting the B candidates except for the resources determined to be inefficient for allocation of PSSCH transmission resources on the basis of the sensing result in step 1 is described below.

1. Monitoring is performed in the sensing window 703 except for a slot in which actual transmission is performed.

2. The L1 SL RSRP threshold $Th_{a,b}$ is configured as $Th_{priTX,PriRX}$ according to a defined priority level. PriTX is a priority of the transmission UE, and b is a priority of another UE detected from the received SCI.

3. The total number of resource candidates $R_{x,y}$ in the resource selection window 702 is configured as a set $S_A$.

4. When the following condition is satisfied, the UE excludes the corresponding resource candidates $R_{x,y}$ from the $S_A$.
    A. There is a slot tz that is not monitored due to actual transmission in process 1. There are reserved resources connected to tz within the resource selection window by a configured resource reservation period (refer to Method 2 in [Mode 2 resource reservation method]), or
    B. Unicast or groupcast transmission is determined through SCI decoding and there are resources reserved for the future by the received SCI.

5. When the following conditions are all satisfied, the UE excludes the corresponding resource candidates $R_{x,y}$ from the $S_A$.
    A. First, the UE may acquire resource allocation information for another UE from the SCI received at $t_m$ within the sensing window 703 (refer to the above [resource allocation information of the 1$^{st}$ SCI]), and.
    B. L1 SL RSRP is measured (refer to the L1 SL RSRP measurement method) and the corresponding value is larger than the configured $Th_{priTX,PriRX}$, and
    C. There are resources reserved for tm within the resource selection window by the configured resource reservation period and there are resources expected to overlap $R_{x,y}$ of $S_A$ in the future.

In this case, a detailed operation of the condition C may be described with reference to [Table 9] below. In [Table 9] below, SCI format 0-1 may be a $1^{st}$ stage SCI. $(t_0^{SL}, t_1^{SL}, \ldots, t_{T_{max}}^{SL})$ may be defined as a set of slots belonging to the sidelink resource pool. In [Table 9], $P_{rsvp\_RX}$ may be values sequentially mapped to values of $P_{resp\_RX} \in \{0.1, 0.2, 0.3, 0.4, 0.5, 0.6, 0.7, 0.8, 0.9, 1, 2, 3, 4, 5, 6, 7, 8, 9, 10\}$ by $P \in \{1:99, 100, 200, 300, 400, 500, 600, 700, 800, 900, 1000\}$ ms when the resource reservation period (P) is configured. $T_{scal}$ may be a value obtained by converting the remaining Packet Delay Budgets (PDBs) in units of slots.

TABLE 9 the SCI format received in slot $t_m^{SL}$ the same SCI format
which, if and only if the "Resource reservation period" field is present in the received SCI format 0-1, is assumed to be received in slot(s) $t_{m+q \times P_{rsvp\_RX}}^{SL}$ determines the set of resource blocks and slots which overlaps with $R_{x,y+j \times P_{rsvp\_TX}}$, for $q = 1, 2, \ldots, Q$ and $j = 0, 1, \ldots, C_{resel} - 1$. Here, $P_{rsvp\_RX}'$ is $P_{rsvp\_RX}$ converted to units of logical slots, $Q = \left\lceil \dfrac{T_{scal}}{P_{rsvp\_RX}} \right\rceil$ if $P_{rsvp\_RX} < T_{scal}$ and $n' - m \leq P_{rsvp\_RX}'$, where $t_n^{SL} = n$ if slot n belongs to the set $(t_0^{SL}, t_1^{SL}, \ldots, t_{T_{max}}^{SL})$, otherwise slot $t_n^{SL}$ is the first slot after slot n belonging to the set $(t_0^{SL}, t_1^{SL}, \ldots, t_{T_{max}}^{SL})$; otherwise $Q = 1$. $T_{scal}$ is remaining packet delay budget (in slots).

6. When the number of resource candidates left in $S_A$ is smaller than B, $Th_{priTX,PriRX}$ is increased and process 3 is repeated.

7. The process is repeated until the number of resource candidates $R_{x,y}$ within $S_A$ becomes B.

When B candidates are selected through the process, a set of the resource candidates may be defined as $S_B$. The UE reports $S_B$ to the higher layer.

Subsequently, step 2 of (re-)selecting resources is an operation of determining transmission resources from $S_B$ which the UE reports to the higher layer in step 1. The higher layer of the UE may randomly select transmission resources from among resource candidates in $S_B$. It is possible to avoid selection of the same resources between UEs through random selection of resources in $S_B$. The case in which resource selection is performed only for one MAC Protocol Data Unit (PDU) and the case in which resource selection is performed for a plurality of MAC PDUs through a reservation interval period configuration (refer to Method 2 of the following [Mode 2 resource reservation method]) are separately described. The MAC PDU may be a unit corresponding to one TB in the physical layer.

The UE may select and reserve a maximum of Nmax resources for one MAC PDU (see Method 1 of the following [Mode 2 resource reservation method]). That is, when Nmax is configured as 3, the UE may select a maximum of three resources. Of course, when Nmax is configured as 3, the UE may select only one resource or only two resources.

A detailed process of step 2 of (re-)selecting resources when resource selection is performed for one MAC PDU is described below.

1. The higher layer of the UE may randomly select transmission resources for one transmission opportunity from among resource candidates in $S_B$.

If the UE selects two or more resources (>1), the operation may move to detailed process 1) or process 2) below. Whether enable or disable an SL HARQ feedback may be configured through a Sidelink Radio Bearer (SLRB).

If the HARQ feedback is disabled (when a retransmission method is blind retransmission), transmission opportunity(s) may be selected by detailed process 1) below.

1) Transmission resources for another transmission opportunity may be randomly selected from among the remaining resource candidates after the selection of one transmission opportunity from among resource candidates in $S_B$ reported to the higher layer of the UE in process 1. Process 1) may be repeated to additionally select the transmission opportunity according to the number of resources selected by the UE.

Unlike this, if the HARQ feedback is enabled (when a retransmission method is HARQ feedback-based retransmission), transmission opportunity(s) may be selected by detailed process 2) below.

2) Transmission resources for another transmission opportunity may be selected in consideration of a period (N) of resources for transmitting and receiving a PSFCH in connection with the HARQ feedback, an offset value (K) between a slot for receiving a PSSCH and a slot for transmitting a PSFCH, and a preparation time for PSSCH retransmission (including a time during which HARQ ACK/NACK is received and decoded). Accordingly, the UE should maintain a minimum time gap considering the time for two selected resources. Specifically, as illustrated in FIG. 10C, when the HARQ feedback is enabled, the UE should select a transmission opportunity to maintain the time gap. Process 2) may be repeated to select an additional transmission opportunity according to the number of resources selected by the UE.

3) In the transmission opportunities selected in process 1) or process 2) above, the temporally first transmission opportunity may be used for initial transmission and the following transmission opportunities may be sequential transmission resources for retransmission.

When the UE selects two or more resources (>1), the condition in [Table 9] should be satisfied.

First, in [Table 10] below, it is required to select an interval between two resources selected for one TB by a range indicating a time gap between the two resources through the $1^{st}$ stage SCI. That is, a time range of allocated resources indicated by the $1^{st}$ stage SCI may be W. W may be given as the number of logical slots belonging to the resource pool. For example, W may be 32 slots in which case a condition in [Table 10] below should be satisfied when resources are selected.

TABLE 10

For any two selected slot sets, when a set of slots $t_{n+j \times P_{rsvp\_TX}}^{SL}$ for $j = 0, 1, \ldots, I - 1$ have been selected for a set of transmission opportunities of PSSCH, a set of slots $t_{n+k+j \times P_{rsvp\_TX}}^{SL}$ for $j = 0, 1, \ldots, I - 1$ for another set of transmission opportunities of PSSCH shall meet the conditions $-31 \leq k \leq 31$ and $k \neq 0$ where I is the maximum number of transmission opportunities of PSSCH in a selected slot set.

Subsequently, as described in 2), the condition in which the UE maintains the minimum time gap considering the time for two selected resources in order to select transmission resources for another transmission opportunity in consideration of the period (N) of resources for transmitting and receiving the PSFCH in connection with the HARQ feedback, the offset value (K) between the slot for receiving the PSSCH and the slot for transmitting the PSFCH, and the preparation time for PSSCH retransmission (including the time during which the HARQ ACK/NACK is received and decoded) may be defined as shown in [Table 11] below. Hereinafter, a condition in which PSFCH transmission is enabled in the resource pool may be handled equally to the condition in which the HARQ feedback is enabled. Further, MinTimeGapPSFCH may be a parameter corresponding to the offset value (K) between the slot for receiving the PSSCH and the slot for transmitting the PSFCH, and periodPSFCHresource may be a parameter corresponding to the period (N) of resources for transmitting and receiving the PSFCH.

TABLE 11

If PSFCH transmission in the resource pool is enabled, the UE shall ensure a minimum time gap
k = a + b between any two transmission opportunities of PSSCH where
- a is a time gap between PSSCH transmission and corresponding PSFCH reception in slots
  determined by high layer parameter of MinTimeGapPSFCH and periodPSFGHresource.
-   b is a PSFCH processing plus PSSCH retransmission preparation time in slots
determined by UE implementation.

2. The selected transmission opportunity(s) may be a selected sidelink grant.

When the selected sidelink grant is available, in other word, when transmission of the MAC PDU is possible, the operation may move to process 3.

3. The UE may determine time and frequency locations at which the PSCCH and the PSSCH are transmitted using the selected sidelink grant.

4. The selected sidelink grant may be a configured sidelink grant.

A method of (re-)selecting and reserving resources when resource selection is performed for one MAC PDU is described below in more detail through Method 1 of the following [Mode 2 resource reservation method].

Subsequently, a detailed process of step 2 of (re-)selecting resources when resource selection is performed for a plurality of MAC PDUs is described below.

Transmission opportunity(s) selected through the application of the method of selecting resources for one MAC PDU may be the selected sidelink grant (refer to process 2). At this time, a set of transmission opportunities for a plurality of MAC PUDs may be selected by the number of reservations configured with an interval indicated by the reservation interval period on the basis of each of the transmission opportunity(s). The transmission opportunities of each set may be used for initial transmission and retransmission. The sets may be the selected sidelink grants. In this case, process 3 and process 4 described above may be performed. A method of (re-)selecting and reserving resources when resource selection is performed for a plurality of MAC PDUs is described below in more detail through Method 2 of the following [Mode 2 resource reservation method].

Subsequently, an operation in which the UE reserves transmission resources after the resources are selected in the resource selection widow on the basis of the sensing result in the sensing window is described according to the above description. The following two methods may be used as methods by which the UE reserves transmission resources in the sidelink.

[Mode 2 Resource Reservation Method]

Method 1 (dynamic reservation): the transmission UE reserves N-Nmax resources for one TB and transmits frequency-time resource allocation information to the reception UE through the $1^{st}$ SCI when a method by which resources are reserved by an SCI related to another TB is not used.

Method 2 (semi-persistent reservation): the transmission UE may successively reserve resources for a plurality of TBs after a time point corresponding to the indicated reservation period (resource reservation period (P)) for the N≤Nmax resources reserved by Method 1 when a method by which resources are periodically reserved by an SCI related to another TB is used. At this time, the transmission UE transmits information on the reservation period (resource reservation period) to the reception UE through the $1^{st}$ SCI.

Method 1 may be a method of dynamically reserving N≤Nmax resources for one TB.

Figure 11A:
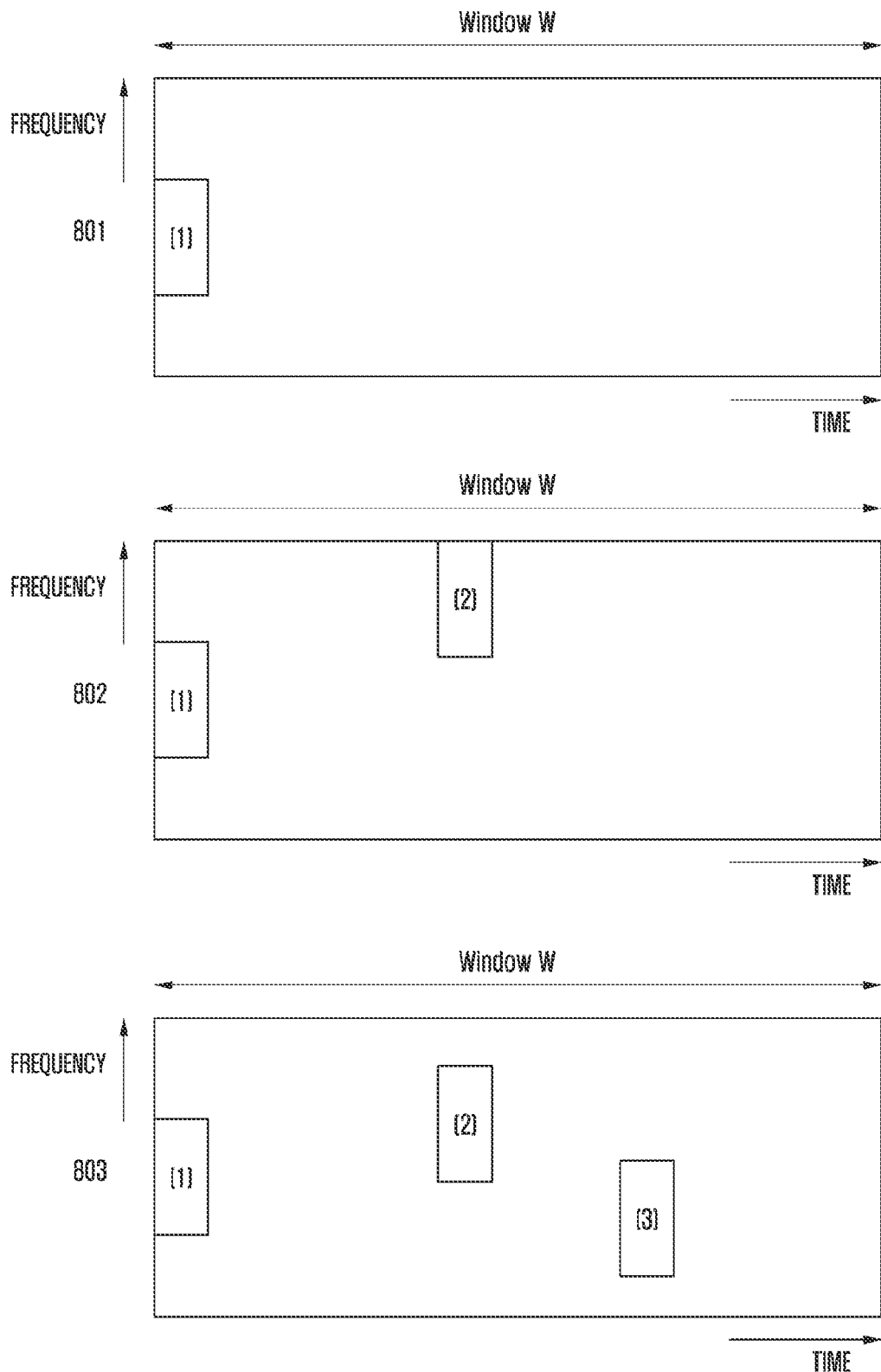
FIG. 11A illustrates a method of reserving time-frequency resources according to an embodiment of the disclosure.
Figure 11B:
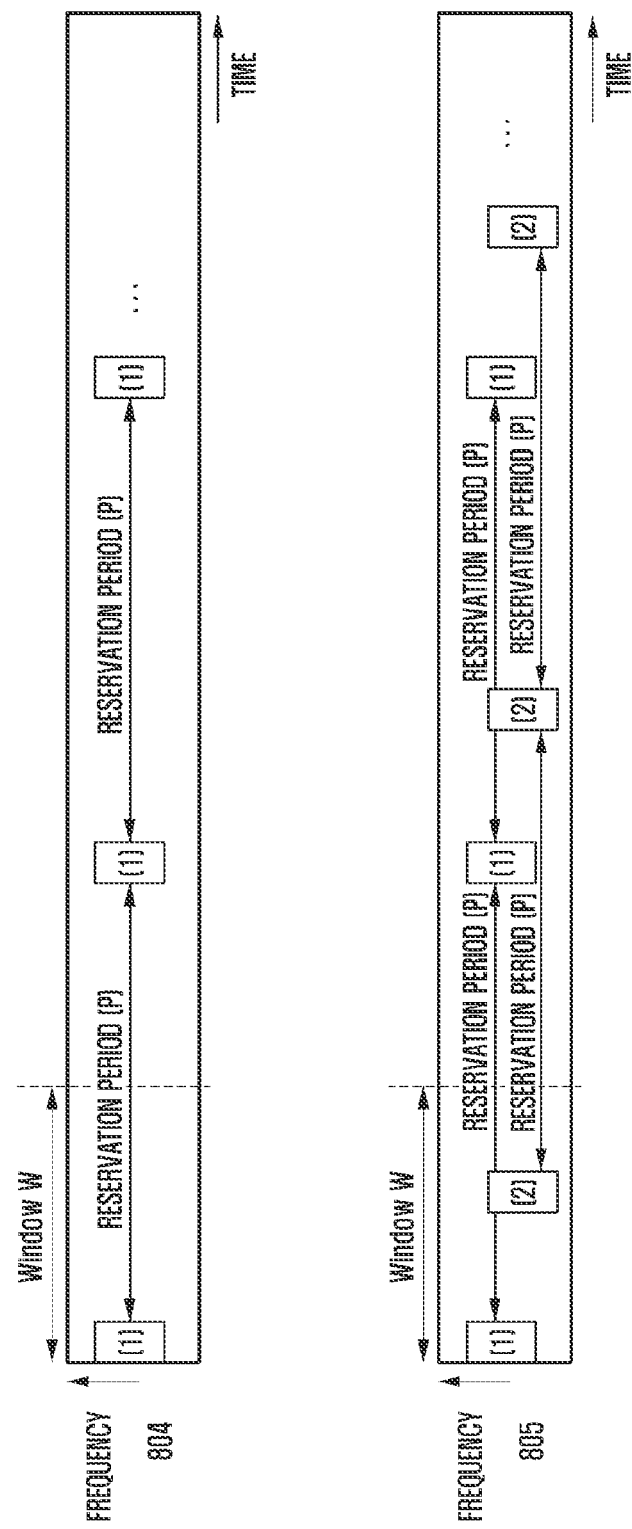
FIG. 11B illustrates a method of reserving time-frequency resources according to an embodiment of the disclosure.

FIGS. 11A and 11B illustrate an example of a method of reserving time-frequency resources according to an embodiment of the disclosure.

For example, FIG. 11A illustrates an example of a method of reserving one time-frequency resource 801, or two time-frequency resources 802, and three time-frequency resources 803 by Method 1. Nmax may be a preconfigured value, for example, 2 or 3. That is, Nmax is configured as 3, a maximum of three pieces of resource allocation information may be transmitted through SCI. Of course, when Nmax is configured as 3, only one piece of resource allocation information may be transmitted, only two pieces of resource allocation information may be transmitted, or three pieces of resource allocation information may be transmitted. A range of the frequency-time resources which can be allocated may be W. That is, a time range of allocated resources which can be indicated by the SCI may be W. W may be given as the number of slots. For example, W may be 32, which may mean that Nmax pieces of resource allocation information may be transmitted through the SCI in 32 slots. In the case of Method 1, the number of subchannels for N Nmax resources reserved by Method 1 is constant but the location of frequency resources for each resource may be different.

Subsequently, Method 2 may be a method of periodically reserving resources for a plurality of TBs. The following values may be considered as a value corresponding to the reservation period (resource reservation period (P)). P∈{0, 1:99, 100, 200, 300, 400, 500, 600, 700, 800, 900, 1000} ms. P=0 may indicate that Method 2 is not used. In other words, it may indirectly indicate that resources are not periodically reserved and Method 1 is used. In a method by which the transmission UE transmits the reservation period P to the reception UE through the $1^{st}$ SCI, a set for actually used reservation periods may be (pre-)configured in the resource pool, and the set equal to or smaller than 4 bits may be inserted into the 1$^{st}$ SCI and transmitted.

For example, when P∈{0, 100, 200, 300} is configured as the set, it may be indicated using only SCI information of 2 bits. Accordingly, a total number of bits for the 1$^{st}$ SCI indicated in the corresponding resource pool may vary depending on the number of sets for the reservation period configured in the resource pool. Before the higher layer Cresel is configured as a counter and the corresponding counter becomes 0, the UE does not perform triggering for resource (re-)selection and re-evaluation and resources may be transmitted using the resources periodically reserved for the plurality of TBs.

FIG. 11B illustrates an example of a method of semi-persistently reserving resources according to the reservation period (P) by Method 2. As indicated by reference numeral 804, a method of selecting and reserving one resource by Method 1 and periodically reserving resources according to the reservation period (P) by Method 2 is illustrated. As indicated by reference numeral 805, a method of selecting and reserving two resources by Method 1 and periodically reserving resources according to the reservation period (P) by Method 2 is illustrated. In Method 2, locations of frequency resources selected by Method 1 and the number of allocated subchannels may have the constant reservation period (P).

Embodiment 2

In Embodiment 2 of the disclosure, a method by which the reception UE calculates and reports a CQI and an RI as CSI information in the V2X sidelink. It is assumed that the CQI and the RI are always reported along with the report of CQI+RI in the disclosure. As described above, when the UE transmits the feedback of CQI+RI, the CQI is calculated on the basis of the determined RI. In this case, the CQI and the RI are independently fed back. For example, when a maximum of two transmission layers are considered for PSSCH transmission, the RI may be reported after it is determined whether a preferred rank is 1 or 2 on the basis of the channel estimation result through only 1-bit information. However, when a maximum of 8 transmission layers are considered for PSSCH transmission, the number of bits required for reporting the RI should be increased to 3 bits. [Table 1/2/3] show a 4-bit CQI table used in NR Uu. The same CQI table may be reused in the sidelink.

Unlike this, a method of joint-encoding the CQI and the RI and transmitting a feedback thereof may be considered. In this case, the method is a method in which, when CQI+RI is fed back, the CQI is not calculated on the basis of the determined RI but the CQI and the RI are simultaneously determined on the basis of a table in which the CQI and the RI are joint-encoded. For the table in which the CQI and the RI are joint-encoded, a method designing, defining, and using a table in which a modulation, a coding rate, and the RI are encoded together may be used, but the existing CQI table may be used and the RI mapping to a CQI index may be (pre-)configured for a simpler method.

Specifically, the preconfiguration method is a method of pre-storing the RI mapping to the CQI index in the UE, or unlike this, the RI mapping to the CQI index may be configured in the higher layer. When the higher layer is used, the RI mapped to the CQI index may be configured in Uu-RRC or PC5-RRC. When the table in which the CQI and the RI are joint-encoded is supported, the RI mapped to the CQI index may be inserted into and configured in the report setting configuration. When such a method is used, the trouble of designing the table in which the modulation, the coding rate, and the RI are encoded together may be saved, and the number of CSI feedback bits may be more reduced compared to the method of independently feeding back the CQI and the RI.

Embodiment 3

Embodiment 3 of the disclosure proposes a method of reflecting a Channel Busy Ratio (CBR) when an SL CSI is reported and generating and reporting the SL CSI. A transmission parameter configuration range may be determined according to whether the corresponding channel is congested in the V2X sidelink. This corresponds to a congestion control function for configuring a transmission parameter to increase a transmission success probability of the UE when the UE determines whether to access the channel and accesses the channel when the channel is congested. Accordingly, the UE may measure a Channel Busy Ratio (CBR) and determine the transmission parameter configuration range according thereto. Further, reflection of the CBR may be also considered when the SL CSI is transmitted. First, the CBR may be defined as follows.

CBR

A Channel Busy Ratio (CBR) measured in slot n is described below.

For the PSCCH, it is defined as a ratio of subchannels of which Sidelink Received Signal Strength Indicators (S-RSSIs) measured by the UE in slot [n−100, n−1] in the resource pool are larger than a (pre-)configured threshold.

A slot index is based on a physical slot index.

The S-RSSI denotes a received signal strength and indicates how much power (in [W]) is received by the reception UE, and is observed by valid OFDM symbol locations within the sidelink slot and a configured subchannel.

Whether the corresponding channel is congested may be detected by the CBR measured by definition of the CBR. The measured CBR may be mapped to a corresponding CBR level, and the transmission parameter configuration range may be determined by the CBR level. The transmission parameters determined by the CBR level may include transmission power (Max Tx power), Channel Occupancy Ratio (CR) limit, a PSSCH Modulation and Coding Scheme (MCS), a PSSCH Rank Indicator (RI), a PSSCH Resource Block (RB) allocation range, and PSSCH retransmission-related information. However, in the disclosure there is not limit in other information which can be included in the transmission parameters by the CBR level.

The case in which the measured CBR level is higher means a congested environment in which many UEs access the corresponding channel to perform transmission in which case it may be advantages to configure the transmission parameter range in a direction of increasing the transmission probability of the transmission UE. The transmission parameter configuration range corresponding to the CBR level may be (pre-)configured. For example, it may be configured in a V2X SIB, Uu-RRC, or PC5-RRC. [Table 12] and [Table 13] show examples of the Tx parameter set determined by the CBR level. [Table 12] shows a method of configuring minimum and maximum configuration ranges of the PSSCH MCS, the PSSCH RI, the PSSCH RB allocation range, and the PSSCH retransmission-related parameter, and [Table 13] shows a method of configuring ranges of values which can be maximally configured for all parameters.

TABLE 12

| Parameter | Value | |
| --- | --- | --- |
| Max Tx power | | max |
| CR limit | | max |
| PSSCH MCS range | min | max |
| PSSCH RI range | min | max |
| PSSCH RB range | min | max |
| PSSCH retransmission range | min | max |

TABLE 13

| Parameter | Value |
| --- | --- |
| Max Tx power | max |
| CR limit | max |
| Max PSSCH MCS | max |
| Max PSSCH RI | max |
| Max PSSCH RB | max |
| Max PSSCH retransmission | max |

As described above, the UE corresponding to the transmission side in the sidelink may measure the CBR for congestion control and perform a function of controlling the transmission parameter therethrough. Accordingly, reflecting the CBR to feedback the SL CSI by the reception UE when the SCL CSI is transmitted may be a required function for congestion control. It is possible to calculate the CQI or the RI in consideration of the CBT when the feedback of the CQI or the RI in the SL CSI report considered by the disclosure is transmitted. Specifically, the following methods may be considered.

CSI Report Method Considering CBR

Method 1: the CBR is measured by the reception UE corresponding to the reception side, and a feedback index for the CQI or the RI is determined within a transmission parameter configuration range determined according to the CBR measured by the reception UE.

Method 2: CBR information measured by the transmission UE corresponding to the transmission side is transmitted to the reception UE, and the reception UE determines a feedback index for the CQI or the RI within a transmission parameter configuration range determined according to the corresponding CBR.

Method 3: the reception UE corresponding to the reception side determines a feedback index for the CQI or the RI within a transmission parameter configuration range determined according to a CBR corresponding to min (CBR_tx, CBR_rx) when CBR information from the transmission UE and the CRB measured by the reception UE are all available.

It is noted that the CBR measured by the transmission UE corresponding to the transmission side and the CBR measured by the reception UE corresponding to the reception side may have different values. Specifically, distribution of UEs located around the transmission UE and distribution of UEs located around the reception UE may be different.

Method 1 is a method by which the reception UE directly measures the CBR and applies the CBR to the CSI report. Since the reception UE may switch to and operate as the transmission UE anytime in the sidelink, detecting a congestion state of the channel through CBR measurement may be a natural operation. Method 2 is a method by which the transmission UE signals CBR information to the reception UE and applies the same to the CSI report. Signaling of the CBR information may be performed through the SCI. If a two-step SCI is introduced, the CBR information may be included in a second SCI. When 16 CBR levels are considered, 4 bit-information may be included in the SCI and transmitted to the reception UE. Method 3 is a method which can be applied by the reception UE when both the CBR information (CBR_tx) of the transmission UE and the CBR information (CBR_rx) measured by the reception UE are available in which case the CBR corresponding to min (CBR_tx, CBR_rx) is applied to the CSI report in consideration of the worst case.

As described above, the PSSCH MCS and the PSSCH RI which can be transmitted may be determined according to the CBR level, and thus the UE may report the CSI in consideration thereof. More specifically, the UE selects the CQI index not to exceed the target transport block error probability according to definition of the SL CQI, but if the CBR is also considered, the CQI index may be determined to be the highest CQI index in a PSSCH MCS range which can be transmitted and a maximum value may be determined according to the CBR level. Further, when the CL CSI is generated and report through reflection of the BCR, transmission parameters determined by the CBR of Method 1/2/3 should satisfy CR limit. In this case, the UE is required to satisfy the CR limit by dropping transmission or through another method. Accordingly, it is difficult to satisfy the CR limit, the CL CSI may not be reported. In addition, when it is difficult to satisfy the CR limit, the reception UE may not perform the CL CSI report and the HARQ report as well as data transmission.

The reception UE corresponding to the reception side may consider transmission of a feedback of CBR information as the SL CSI information to the transmission UE corresponding to the transmission side. As described above, since distribution of UEs located around the transmission UE and distribution of UEs located around the reception UE are different, the CBR measured by the transmission UE and the CBR measured by the reception UE may have different values. Accordingly, when the transmission parameter is determined using both the CBR information (CBR_tx) measured by the transmission UE and the CBR information (CBR_rx) of the reception UE, it may be more advantageous to congestion control. Specifically, when the parameter value within the corresponding transmission parameter range is transmitted using the CBR corresponding to min (CBR_tx, CBR_rx) in consideration of the worst cast, the better performance of congestion control may be expected.

A method by which the reception UE transmits a feedback of CR information instead of a feedback of CBR information to the transmission UE may be considered. Using both the CR limit (CR_tx) by the CBR measured by the transmission UE and the CL limit information (CR_rx) of the reception UE by the transmission UE may be more effective at congestion control. Specifically, the transmission UE may satisfy the CR limit by dropping transmission or through another method on the basis of the CR limit corresponding to min(CR_tx, CR_rx) in consideration of the worst case.

Figure 12:
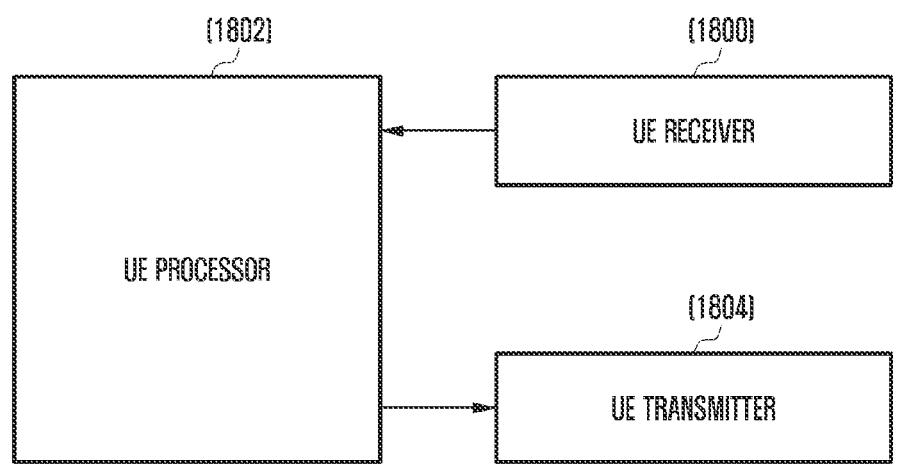
FIG. 12 illustrates the structure of the UE in connection with an embodiment of the disclosure.
Figure 13:
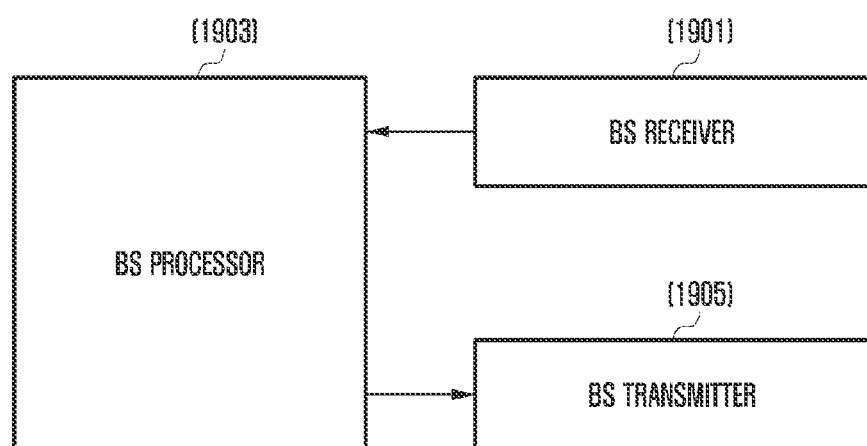
FIG. 13 illustrates the structure of the BS in connection with an embodiment of the disclosure.

In order to perform the above-described embodiments of the disclosure, a transmitter, a receiver, and a processor of each of the UE and the BS are illustrated in FIGS. 12 and 13. In the above embodiment, the method by which the reception UE measures the channel state and reporting the same to the transmission UE and the UE operation during the process in which the vehicle UE supporting Vehicle-to-Everything (V2X) communication exchanges information with another vehicle UE and a pedestrian portable UE through the sidelink are described, and receivers, processors, and transmitters of the BS and the UE should operate according to each embodiment in order to perform the method and operation.

Specifically, FIG. 12 is a block diagram illustrating the internal structure of the UE according to an embodiment of the disclosure. As illustrated in FIG. 12, the UE of the disclosure may include a UE receiver 1800, a UE transmitter 1804, and a UE processor 1802.

The UE receiver 1800 and the UE transmitter 1804 are commonly called a transceiver in the embodiments of the disclosure. The transceiver may transmit and receive a signal to and from the BS. The signal may include control information and data. To this end, the transceiver includes an RF transmitter that up-converts and amplifies the frequency of a transmitted signal, an RF receiver that low-noise amplifies a received signal and down-converts the frequency, and the like.

Also, the transceiver may receive a signal through a radio channel, output the signal to the UE processor 1802, and transmit the signal output from the UE processor 1802 through a radio channel. The UE processor 1802 may control a series of processes such that the UE operates according to the above-described embodiments of the disclosure.

FIG. 13 is a block diagram illustrating the internal structure of the BS according to an embodiment of the disclosure. As illustrated in FIG. 13, the BS of the disclosure may include a BS receiver 1901, a BS transmitter 1905, and a BS processor 1903.

The BS receiver 1901 and the BS transmitter 1905 are commonly called a transceiver in embodiments of the disclosure. The transceiver may transmit and receive a signal to and from the UE. The signal may include control information and data. To this end, the transceiver includes an RF transmitter that up-converts and amplifies the frequency of a transmitted signal, an RF receiver that low-noise amplifies a received signal and down-converts the frequency, and the like.

Also, the transceiver may receive a signal through a radio channel, output the signal to the UE processor 1903, and transmit the signal output from the UE processor 1903 through a radio channel. The BS processor 1903 may control a series of processes such that the BS operates according to the above-described embodiments of the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a first terminal in a wireless communication system, the method comprising:

receiving, from a second terminal via a PC5-radio resource control (RRC) signaling, first information on a channel state information-reference signal (CSI-RS) for sidelink (SL) and second information on a latency bound of a channel state information (CSI) report for the SL;

receiving, from the second terminal, the CSI-RS for the SL based on the first information;

receiving, from the second terminal, control information to trigger the CSI report associated with the CSI-RS;

identifying a time at which the triggered CSI report is transmitted;

in case that the time does not exceed a valid SL CSI window, transmitting, to the second terminal, the triggered CSI report; and in case that the time exceeds the valid SL CSI window, cancelling the triggered CSI report, wherein the valid SL CSI window is determined based on the latency bound which is configured by the PC5-RRC signaling.

2. The method of claim 1,
wherein the first information includes information on a position of a resource for the CSI-RS, and information on a number of a port for the CSI-RS.

3. The method of claim 1,
wherein the CSI-RS is received from the second terminal, in case that the CSI report is configured to be enabled.

4. The method of claim 1,
wherein a reference resource for the CSI report is identified by a same slot as the control information to trigger the CSI report.

5. The method of claim 1,
wherein the CSI report including a rank indicator (RI) and a channel quality indicator (CQI) is transmitted via a medium access control (MAC) control element (CE).

6. The method of claim 1, further comprising:
generating the triggered CSI report based on a measurement for the CSI-RS; and
identifying a physical sidelink shared channel (PSSCH) resource to transmit the triggered CSI report.

7. The method of claim 1,
wherein an aperiodic type of the CSI report is triggered by the control information, and
wherein the latency bound is configured in number of slots.

8. A first terminal in a wireless communication system, the first terminal comprising:
a transceiver; and
a controller configured to:
control the transceiver to receive, from a second terminal via a PC5-radio resource control (RRC) signaling, first information on a channel state information-reference signal (CSI-RS) for a sidelink (SL) and second information on a latency bound of a channel state information (CSI) report for the SL,
control the transceiver to receive, from the second terminal, the CSI-RS for the SL based on the first information,
control the transceiver to receive, from the second terminal, control information to trigger the CSI report associated with the CSI-RS,
identify a time at which the triggered CSI report is transmitted, and
in case that the time does not exceed a valid SL CSI window, control the transceiver to transmit, to the second terminal, the triggered CSI report, and
in case that the time exceeds the valid SL CSI window, cancel the triggered CSI report, wherein the valid SL CSI window is determined based on the latency bound which is configured by the PC5-RRC signaling.

9. The first terminal of claim 8,
wherein the first information includes information on a position of a resource for the CSI-RS, and information on a number of a port for the CSI-RS.

10. The first terminal of claim 8,
wherein the CSI-RS is received from the second terminal, in case that the CSI reporting is configured to be enabled.

11. The first terminal of claim 8,
wherein a reference resource for the CSI report is identified by a same slot as the control information to trigger the CSI report.

12. The first terminal of claim 8,
wherein the CSI report including a rank indicator (RI) and a channel quality indicator (CQI) is transmitted via a medium access control (MAC) control element (CE).

13. The first terminal of claim 8, wherein the controller is further configured to:
generate the triggered CSI report based on a measurement for the CSI-RS; and
identify a physical sidelink shared channel (PSSCH) resource to transmit the triggered CSI report.

14. The first terminal of claim 8,
wherein an aperiodic type of the CSI report is triggered by the control information, and
wherein a latency bound is configured in number of slots.

\* \* \* \* \*